US005987513A

United States Patent [19]
Prithviraj et al.

[11] Patent Number: 5,987,513
[45] Date of Patent: Nov. 16, 1999

[54] NETWORK MANAGEMENT USING BROWSER-BASED TECHNOLOGY

[75] Inventors: Narayanan Prithviraj, Bangalore, India; Mandayam Thondanur Raghunath, Cupertino, Calif.; Vijaya Rao Verma, Bangalore, India; Harihara Vinayakaram Natarajan, Bangalore, India; Harindranath Prema Ravindram Nair, Bangalore, India; Karthik Gargi, Bangalore, India; Godbole Santosh Shashikant, Bangalore, India; Viji Kakkattu Ravindran, Bangalore, India

[73] Assignee: WIPRO Limited, Cupertino, Calif.

[21] Appl. No.: 08/852,081

[22] Filed: May 6, 1997

[30] Foreign Application Priority Data

Feb. 19, 1997 [IN] India .............................. 334/MAS/97

[51] Int. Cl.⁶ .................................................. G06F 17/00
[52] U.S. Cl. ........................................................... 709/223
[58] Field of Search ....................... 395/200.53, 200.54, 395/182.02; 364/551.01; 340/825.06; 709/223, 224

[56] References Cited

U.S. PATENT DOCUMENTS

| | | | |
|---|---|---|---|
| 5,426,421 | 6/1995 | Gray | 340/825.06 |
| 5,701,451 | 12/1997 | Rogers et al. | 395/200.3 |
| 5,742,762 | 4/1998 | Scholl et al. | 395/200.3 |

FOREIGN PATENT DOCUMENTS

WO 98/21668  5/1998  WIPO .............................. G06F 17/00

OTHER PUBLICATIONS

Internetwork Management Product Catalog; "Cisco Rolls Out Innovations in Network Management", Jun. 6, 1995.
Bay Networks; "Optivity Web", Nov. 1996.
Service Level Management; "Netcol: Creating Order from Chaos", 1994.
Asante; "Intraspection Features"; Dec. 1996.

Primary Examiner—Ellis B. Ramirez
Attorney, Agent, or Firm—Sterne, Kessler, Goldstein & Fox, P.L.L.C.

[57] ABSTRACT

A network management system which enables a user to manage a network using browsers available on remote computer systems. A designer provides a page specification document identifying information elements of interest and corresponding explanatory labels. The page specification document is translated into a plurality of hypertext documents. The page specification document also allows the designer to logically group the information elements of interest, and the grouping automatically defines the sequence in which the hypertext documents are accessed from other hypertext documents by actuating hypertext links in the other hypertext documents. The user interface is further simplified by providing Java Applets, which provide a simple user interface.

41 Claims, 13 Drawing Sheets

WELCOME TO LTS MANAGEMENT

ACTIONS

CONFIGURE/SHOW

MONITOR

CURRENT PORT STATUS

FIG. 7

BOOT PARAMETERS

| | |
|---|---|
| LOAD PROTOCOL | TFTP ▼ |
| CONFIG FILE | |
| LOAD HOST IP ADDRESS | 192.9.60.25 |
| SERVER BOOT SOFTWARE | ncs22.mer |
| LAN INTERFACE | TENBASE-T ▼ |
| DISPLAY BOOT MESSAGES | DISPLAY ▼ |

| REFRESH | SET REFRESH INTERVAL | SET |

FIG. 8A

IPX TABLE

| SELECT | IPX LAN INTERFACE | INTERFACE STATUS |
|--------|-------------------|------------------|
| 0 | ETHER | DOWN |

[ ADD NEW ROW ]   [ MODIFY ROW ]   [ DELETE ROW ]
       [ REFRESH ]   [ SET REFRESH INTERVAL ]

FIG. 8B

OUTPUT DATAGRAM STATISTICS

| REQUESTS | 6394 | ENABLE GRAPHING ☐ |
| DISCARDS | 0 | ENABLE GRAPHING ☐ |
| NO ROUTE | 0 | ENABLE GRAPHING ☐ |

[ REFRESH ]   [ SET REFRESH INTERVAL ]   [ DRAW GRAPH ]

FIG. 8C

NETWORK MANAGEMENT USING BROWSER-BASED TECHNOLOGY

BACKGROUND OF THE INVENTION

1. Field of the Invention

The present invention relates generally to network management, and more particularly to a system and method for managing network elements using web browsers available in the market place.

2. Related Art

Computer systems are often connected using networks. The resulting connectivity enables several features such as sharing of data and other resources on the network. For example, networks enable applications such as electronic mail, network file systems (sharing of data using disks accessed over networks), distributed processing (different computer systems executing different parts of a program, generally in parallel) and sharing of printers. These applications usually result in enhanced communication capabilities, efficient use of resources, and/or faster processing of data, thereby leading to productivity gains.

Provision of network connectivity and applications generally entails the operation of several network elements implemented according to predefined interfaces. Network elements include, but are not limited to, hardware circuits/devices and software entities (e.g., a process or a thread) which may operate according to interface specifications to provide the network connectivity or applications. The interfaces may be based on open standards such as Transmission Control Protocol/Internet Protocol (TCP/IP) and IEEE 802 family of protocols commonly used in the Internet Community, or proprietary standards such as System Network Architecture (SNA) implemented mostly in IBM computing environments.

Proper management of such networks may be critical in the provision of network connectivity and applications. In general, network management can include several functions such as network monitoring (e.g., to ensure the proper operation of network elements in the network), performance management (e.g., to ensure performance bottlenecks are within acceptable levels), software distribution etc. The proper operation of each network element may be critical in a networking environment as the malfunctioning of (or performance bottleneck in) any network element in the path between two computer systems (or any two network resources) may adversely impact the applications and services between the two computer systems. As the network elements are typically shared (or used) by several (potentially in the range of thousands) computer systems, many of them located in remote networks, the performance bottlenecks are often of great concern to managers/operators of computer systems and networks. In addition, as each network element may execute using different revisions or versions of software, it may be important to ensure that all network elements operate using software versions which can operate cooperatively in a desired manner.

Network management stations (NMS) implementing network management functions are employed to manage the networks. Typically, network operators manage the network using a suitable interface (generally graphical user interface based) on a NMS. The NMS indicates by a suitable alarm any problems with or changes in the status of the network. The operator may take appropriate corrective action with or without using the NMS.

The network management task is often complicated by the fact that each of the network elements may be provided by several vendors. The network elements may simply need to conform to a pre-defined interface (or standard) to operate as a part of an integrated network. While the availability of each network element from multiple vendors may lead to reduction in prices, the management of networks having network elements from several different vendors poses additional challenges to network managers.

For example, some vendors may allow their network elements to be managed from proprietary platforms only. Some vendors may support standards based network management applications (e.g., Simple Network Management Protocol), but the integration of the management of their devices into an NMS often requires extensive training. For example, the installation of the software to work with an NMS may require training from the vendor. Operators may need more training for providing on-going support. Such training may need to be provided each time a new network element is added to the network. In addition, substantial effort may be required on the part of the vendors to develop software which runs on the NMS. The resulting overhead due to the development and training required may be unacceptable in certain situations.

Therefore, what is needed is a network management solution which allows easy integration of additional devices. The solution must also be usable by operators without requiring significant training.

There are yet more challenges encountered while managing networks that typically span multiple organizations and distant geographies. A network manager/operator may wish to monitor the status of a remote network. As will be appreciated, it is often impractical to install or provide the software for managing each network element on all remote sites. In addition, a manager/operator may wish to monitor the remote network from any of several machines. A manager may further wish to know the events which may have occurred prior to the precipitation of a problem.

Therefore, what is also needed is a network management solution which allows a person to easily monitor a remote network, preferably from several machines. The network management solution should also allow the person to know significant events which may have occurred around (before and after) the time a problem has precipitated in the network. This knowledge may facilitate easier problem resolution.

SUMMARY OF THE INVENTION

The present invention is directed to a system and method for managing networks using browsers. Specifically, an embodiment of the present invention is implemented on a central network management station and a user can manage the network from any remote computer system implementing a browser. Various Applets and Hypertext documents are provided by the present invention which are accessed using the browser. By simply clicking on the Applet displays and the hypertext links in the Hypertext documents, the user can manage the network. Thus, the management of the network is simplified. The concepts of browsers, Applets and hypertext documents as relevant to the present invention are explained in the section entitled "Detailed Description of the Preferred Embodiments" below.

The integration of new network elements into the network management system is simplified in accordance with the present invention. The present invention is best understood by explaining the manner in which new devices are integrated into the network management system. Accordingly, the integration of new devices (or network elements in general) is explained below first. In the description herein, network elements include, but not limited to, hardware devices and software entities as explained in further detail below.

To integrate a new network element into the network management system of the present invention, a designer provides a page specification document. The page specification document includes an identification of information elements of interest and corresponding understandable labels. An information elements of interest is best understood by an example. A user may wish to know the number of bytes received on a particular interface of a router. Such a number is referred to as an information element of interest. In one embodiment, the information elements are identified by Management Information Base Object Identifiers (MIB OIDs) well known in the art. The page specification document also defines a grouping of the different information elements of interest.

The page specification document is automatically translated into a plurality of hypertext documents. A document is associated with the hypertext links in other documents, and the associated document is accordingly displayed when the hypertext links are actuated from the browser. Thus, the hypertext links define a plurality of sequences in which the hypertext documents can be accessed. The grouping of various information elements of interest in turn determines the sequence in which the documents are accessed as will be clearer from the detailed description. The sequence is implemented by storing each document as a file, and specifying the file identifier as an (URL) associated with the hypertext link as is well known in the art. As the access sequence is defined by the grouping specified by the designer, the designer controls the manner in which different hypertext documents are accessed.

The hypertext documents generated from the translation also include 'templates', which are hypertext documents including dynamic fields. Dynamic fields refer to fields storing and displaying data corresponding to an information element of interest retrieved dynamically and displayed to the user. Thus, each dynamic field is associated with one or more corresponding identifiers (e.g., Management Information Base Object Identifier) for an information element of interest, Using these identifiers, data is retrieved dynamically upon user request and appropriately combined or modified before display to the user. In one embodiment of the present invention, a template is associated with certain parameters of a network element of a given type (e.g., routers or file servers).

All the hypertext documents are stored in a central network management station. The user accesses the documents from a remote or local computer system using a browser in a known way. To view the status of a subject network element, the user actuates the appropriate hypertext links. Such actuation specifies a desired template. The user also specifies an identifier (e.g., a unique Internet Protocol Address) of a subject network element from which to retrieve data dynamically and display using the template.

After receiving identifiers of the template and the subject network element, the network management station assembles SNMP get packets using the MIB OIDs associated with the dynamic fields, and sends the packets to the subject network element. In response, the subject network element sends the requested data. The network management station integrates the received data into the template and sends it back to the browser which displays the template including the received data. The user is also allowed to change the configuration of network elements by modifying or adding or deleting the received data provided such access is permitted. Thus, the user can both monitor the network status and perform configuration management.

In the above description, a user may be required to manually provide the identifier of the subject network element for retrieving the data dynamically. This may not be convenient for the user. To obviate such a need, the present invention provides an Applet based interface as further described below.

In the Applet based interface, a network map is displayed. Each network element is given a label as specified by a designer. The user simply clicks on the network element in the map to manage the element. When the user clicks on a network element, the network management station sends a starting hypertext document (also referred to as the home page for the network element) for the network element to the browser for display. The home page typically corresponds to the first hypertext document in the sequence in which the translated hypertext documents are accessed. As already noted, the sequence is determined by the designer of the page specification document.

However, in a typical environment, there are several network elements of several types, and all network elements of a given type can have one home page. Therefore, to determine the appropriate one of all the stored home pages to send to the browser, the network management station has to determine the type of the network element selected by the user. In one embodiment, the type of each network element is determined by sending an SNMP get packet with SysObjectID variable as is well known in the art. For each network element displayed, the network management station keeps track of the corresponding type. The network management station also keeps track of a corresponding home page for each type of the network elements. From this information, the network management station determines the appropriate home page from the user selected network element.

Thus, when a user clicks on the network element display, network management station automatically identifies the corresponding home page (hypertext document), and sends the document to the browser for display. The user merely has to click the hypertext links to access other hypertext documents and initiate network management actions.

However, when a user action causes the template to be displayed, the network management station needs to know the exact network element from which to retrieve data corresponding to the dynamic fields. The present invention enables this information to be provided transparent to the user as explained below.

When sending the home page and any subsequent hypertext pages as a user actuates the hypertext links, network management station encodes the IP address of the selected network element into the individual lines of the hypertext documents. The encoding is performed in such a way that the IP address is received as a parameter along with the URL, when the corresponding hypertext link is actuated. The network management station then retrieves the data dynamically from a network element with the received IP address, and sends the template including the retrieved data to the browser for display.

The present invention also provides the user the ability to view error conditions which may have occurred during a desired time period. To enable such capability, the present invention includes a process (e.g., Unix Daemon) executing continuously. The process receives reports of network events (e.g., SNMP traps) and stores them in non-volatile memory.

The user can view the traps conveniently from a Java Enabled Browser. Specifically, the present invention provides Applet modules on the central network management station and transfers the Applets to the user computer system upon a user request. The Applets are executed on the user computer system. The executed Applets interact with the daemons to display the error messages of interest.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 7 represents a display generated from the hypertext document of Appendix II, illustrating hypertext documents with only static fields created in one embodiment of the present invention;

FIGS. 8A, 8B and 8C represent displays generated from the hypertext document of Appendices VI, VII and VIII respectively, illustrating hypertext documents with both static fields and dynamic fields created in one embodiment of the present invention;

DETAILED DESCRIPTION OF THE PREFERRED EMBODIMENTS

Figure 1:
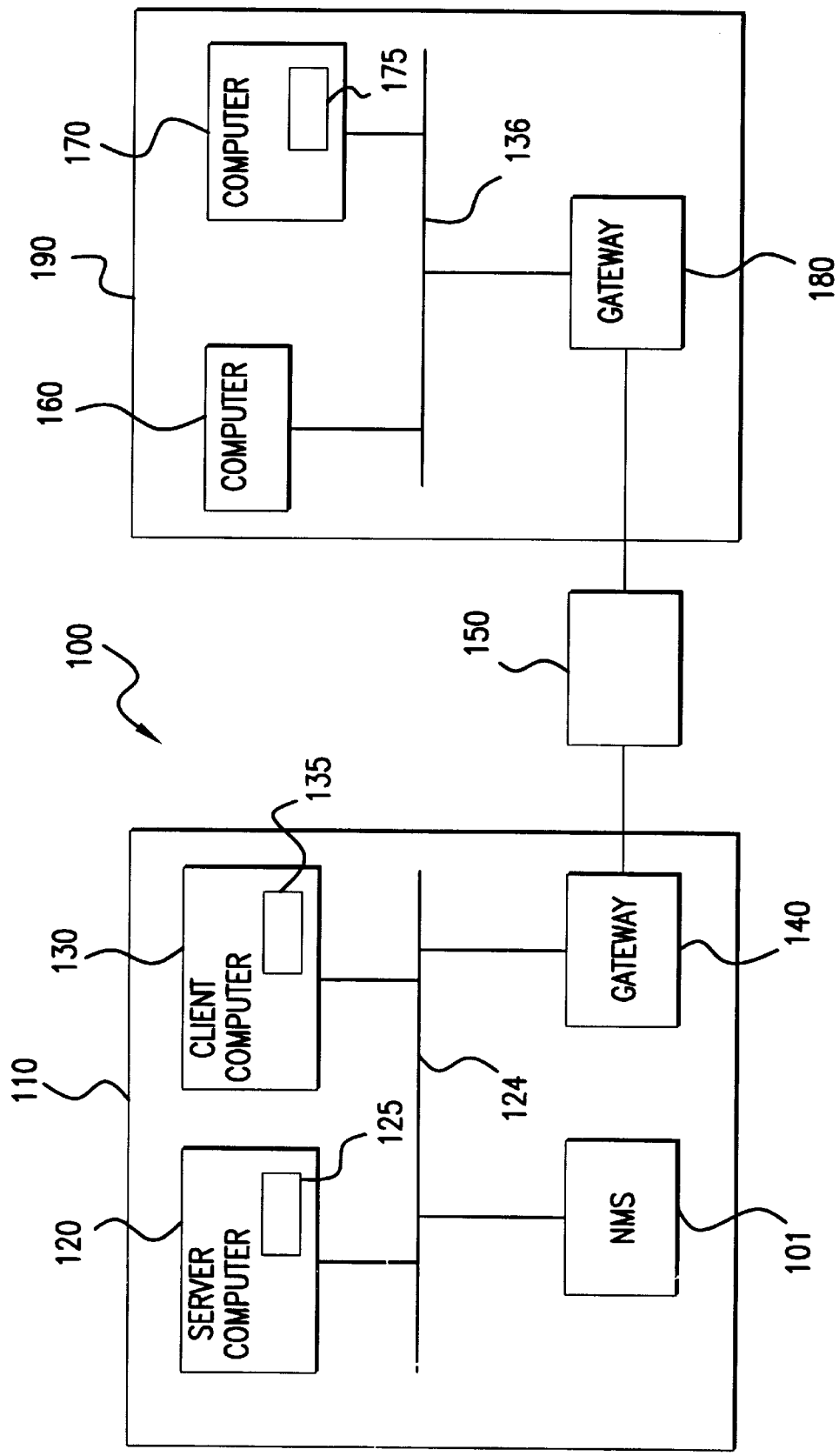
FIG. 1 is a block diagram illustrating an example environment which can be managed by the present invention.

1. Overview and Discussion of the Invention

The present invention is directed toward a system and method for managing networks. Network maps (typically graphical representation of network elements) and hypertext documents are generated and provided on a central network management station in accordance with the present invention. The documents and the network maps may be accessed from any machine using, for example, a Java enabled browser to manage the network. A user simply has to actuate the map portion corresponding to the network elements and the hypertext links of interest (usually by clicking on the hypertext link) to manage the network. For example, if the user selects a subject network element and specific hypertext links, the present invention retrieves the information from the subject network element and displays the information in a predetermined desired format. The user may gather information or change the configuration of each network element by the selection of an appropriate hypertext link.

The concepts of hypertext documents, Java, and browsers that are relevant to the present invention are explained in greater detail below. The manner in which the hypertext documents are created, and how a user can use these documents in network management are also explained in greater detail below. Typically, integration of a new network element into the network management system of the present invention entails in substantial part the generation of such documents.

As will also be clear from the following description, the hypertext documents for managing a network or device can be custom designed and created with relative ease in accordance with the present invention. This allows new network elements to be easily integrated with the network management station implementing the present invention. The time and resources consumed in the integration of new devices is substantially reduced compared to many network management stations available in the market.

As the hypertext documents can be accessed from any machine implementing a browser, network management may be performed from any of such machines in accordance with the present invention. Also, the management interface is simplified as the user may manage a network by selecting the desired hypertext links.

In addition, the present invention keeps a log of the events occurring in the network and makes the event information available to the user upon the selection of an appropriate hypertext link. The present invention also discovers network elements present in the network, and displays the discovered network elements in a graphical user interface (GUI) environment. The user can then selectively manage the displayed elements using the GUI, further simplifying the management function.

Before describing the invention in great detail, it is useful to describe an example environment in which the invention can be implemented. Some of the basic concepts (Browser technology, Java Applets, and SNMP) underlying a preferred embodiment of the present invention are then explained. A preferred embodiment of the present invention is then explained in detail.

2. Example Environment

In a broad sense, the invention can be implemented in any system, preferably on one which can be accessed over a network. Such systems include, without limitation, personal computer systems (PCS), work-stations, special purpose computer systems, and the like. The invention may be implemented in hardware, software, firmware or any combination thereof.

FIG. 1 is a diagram of an example network environment which can be managed by the present invention. The present invention is implemented in an example internetwork 100 and can be used to selectively manage the network elements therein. The management of internetwork 100 is explained with reference to Simple Network Management Protocol (SNMP) implemented in the Internet Protocol (IP) networking environment. However, it should be understood that alternative embodiment of the present invention can be implemented using other network management protocols (e.g., Remote Desktop Management Interface) and networking environments, both open and proprietary (e.g., International Standard Organization's Open System Interconnect Standard, Digital Equipment Corporation's DECnet Environment, International Business Machine's Systems Network Architecture etc.).

The example environment is shown to include two networks 110 and 190 connected by another network 150. Networks 110 and 190 are implemented preferably using Internet Protocol Standard. Network 150 can be implemented either as a single point-to-point connection between gateways 140 and 180 or as several networks spanning a large geographical area. The three networks 110, 150 and 190 together may be referred to as an inter-network 100 (or network of networks). Each of the networks 110, 150, and 190 can span one or more organizations and/or large geographical entities.

Each network 110, 150, and 190 can have several network element. For example, network 110 includes a server computer system 120, a client computer system 130, a network management station (NMS) 101, and a gateway 140. NMS 101 can be used to manage all the elements in networks 110, 150, and 190. Network 110 can include other elements such as an uninterrupted power source which supplies power to the critical elements (e.g., server computer system 120). NMS 101 can be implemented in a dedicated computer system or can be bundled with other computer systems such as server computing system 120.

A client process 135 executing on client computer system 130 operates cooperatively with a server process 125 executing on server computer system 120 according to a pre-defined protocol (e.g., network file systems standard of Sun Micro Systems or file transfer protocol typically implemented with TCP/IP systems) to access data on a disk provided with server computer system 120. The network elements managed by NMS 101 of the present invention include processes such as server process 125 and client process 135.

Computer systems 120 and 130 may communicate with each other using a local network 124. The communication may be implemented using another pre-defined protocol such as IEEE 802 family of standards as is known in the art. The communication can serve as a structure or basis for implementation of applications such as data sharing and electronic mail.

Client process 135 may also access data on the machines on remote networks such as machine 170 on network 190. In this scenario, gateways 140 and 180 provide the required connectivity between computer systems 130 and 160 using network 150. Network 190 is shown to include another client computer system 160. As already noted, network 150 may include several networks or a single communication line providing the physical connection between the gateways 140 and 180.

Figure 2:
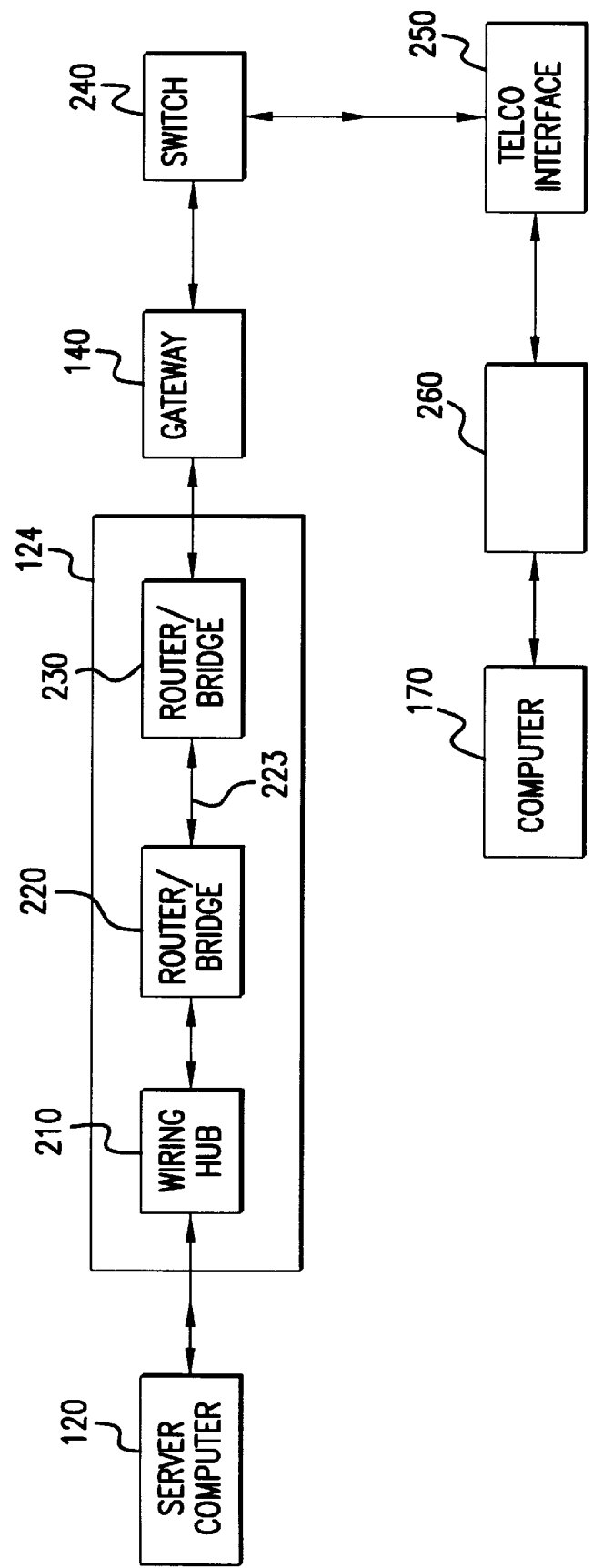
FIG. 2 is a diagram illustrating by means of an example several intermediate network elements typically present between two network elements situated at the ends of a connection.

It should be understood that FIG. 1 is a simplified logical diagram of an example inter-network, and inter-networks typically contain several other (or fewer) components or network elements not shown there. FIG. 2 is a diagram illustrating an example of some additional network elements within the connectivity path when client process 125 communicates with server process 175. Machine 120 is connected to a local network 124, which includes a wiring hub 210 (available, for example, from Cabletron Systems, Inc., 35 Industrial Way, P.O. Box 5005, Rochester, N.H. 03866-5005). Wiring hub 210 receives connections from several machines not shown in the Figures. Wiring hubs generally allow for easier management of the large number of wires/cables to connect computer systems to local networks.

Local network 124 may also include several routers/bridges 220, 230 (available, for example, from Cisco Systems, Inc., 170 West Tasman Drive, San Jose, Calif. 95134-1706, U.S.A.) depending on the size of local network 124. The routers and bridges generally allow for segmentation of a large number of machines into smaller groups, with machines in each group being able to communicate with each other without being affected by communication of machines in other groups. Routers 220 and 230 are shown connected by a bus 223. Bus 223 can be a local network implemented, for example, using IEEE 802.3 standard for Ethernets. Bus 223 can receive connections from several computer systems which can communicate with other computer systems in inter-network 100.

Gateway 140 is shown coupled to switch 240 (e.g., available from Stratacom, Inc. which has merged with Cisco Systems, Inc.) which allows bandwidth sharing features such as Frame Relay or Asynchronous Transfer Mode (ATM), both of which are well known in the art. Switch 240 may accept connections from other systems such as PBXs (for voice signals transmission) and interface with Telco Interface 250 to transmit all the signals (voice and data) in large bandwidth pipes such as T1 or T3 as is well known in the art. The functions described here may be combined into one or more units as available in the market place. For example, routers and wiring hubs may be combined into one unit. Network 190 may also have similar network elements to transfer the data from client process 125 to server process 175.

As will be appreciated, each of the network elements (hardware devices and software that executes on them) may be provided by different vendors so long as the implementation adheres to pre-defined standards or interfaces. The present invention provides a simple user interface to manage the elements, and to integrate the elements into the network management system fairly easily.

To understand the present invention, an understanding of the basic operation of SNMP, Browser Technology and Java Technology are helpful. Accordingly, they are first described generally below followed by a detailed description of the present invention.

3. Brief Introduction to Simple Network Management Protocol (SNMP)

Figure 3A:
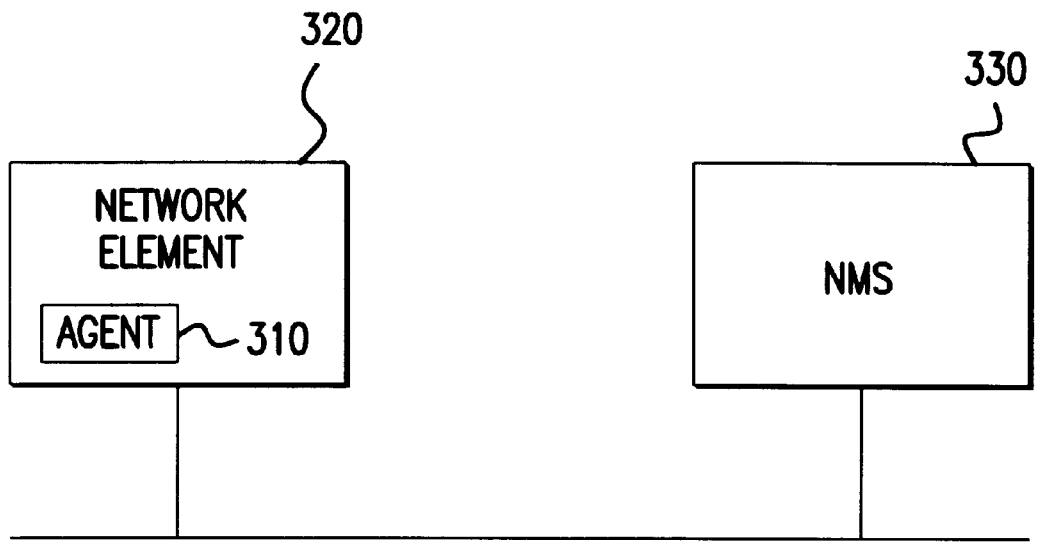
FIG. 3A is a diagram illustrating Simple Network Management Protocol (SNMP) in which an agent executes on a network element.
Figure 3B:
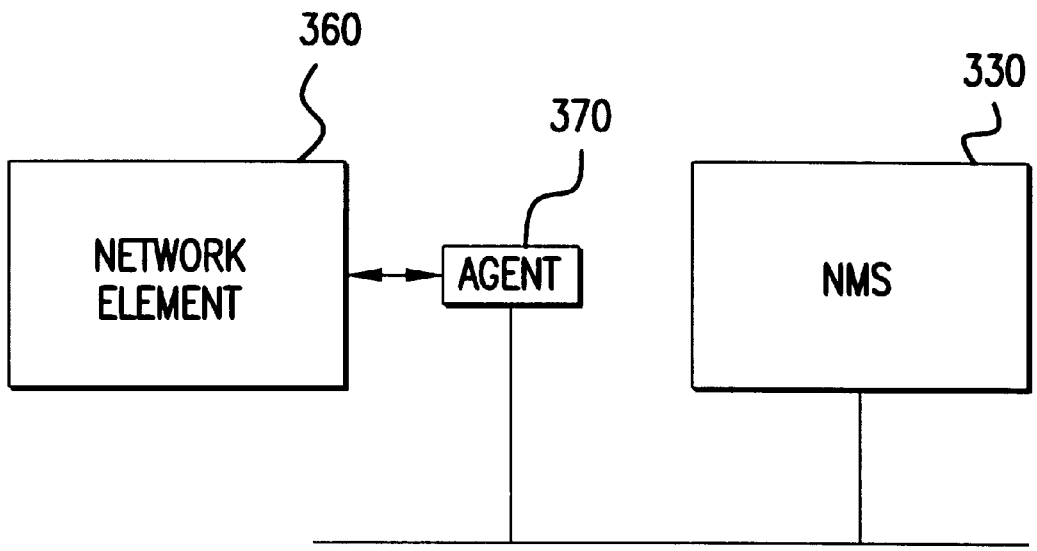
FIG. 3B is a diagram illustrating SNMP in which an agent executes on a machine other than a machine including the network element.

For the sake of brevity, only a brief introduction to SNMP is provided herein. However, information relating to SNMP is available from several public sources such as RFC 1155 and RFC 1214 which are incorporated herein by reference. The reader is referred to these sources for more information on SNMP. Basic to SNMP is an agent corresponding to each network element as illustrated with reference to FIGS. 3A and 3B. Agent 310 may execute on network element 320 itself (shown in FIG. 3A) or agent may execute on a different computer system 370 (FIG. 3B) to manage the respective network elements 320 and 360. Agents 310, 370 receives commands such as 'get' and 'set' from network management station 330. Both the commands specify a target network element and the variable of interest (or information element of interest in general) using a MIB object identifier. The concepts of information elements of interest, MIB, and SNMP commands are explained in that sequence below.

A user may wish to examine, modify, add or delete one or more values on a network element. Assuming the network elements is a router, the user may wish to know information such as uptime of the router or the number of packets received on a particular interface of the router. The user may further wish to add or delete routing table entries on the router. Each piece of these information (i.e., uptime, number of packets, routing table entries in the examples above) is generally referred to as an information element of interest. It should be understood that the information elements of interest are constantly evolving with the addition of new network elements. It will be apparent to one skilled in the art how to apply the present invention to such new information elements of interest also using the disclosure provided herein.

The information elements of interest in the SNMP environment are given unique identifiers and defined as a part of the MIB. The uniqueness of identifiers for information elements of interest is accomplished by organizing all the information elements in the form of a tree. For example, all information relating to a network element from a particular vendor may begin with 1.2.2.4 (It is noted the MIB OID values provided here may not be accurate, but are provided for illustration purpose only). Assuming the network element has several interfaces, the information on the network element interfaces may be identified by 1.2.2.4.5. The first interface of the network element may be specified as 1.2.2.4.5.1. The number of packets received on the first interface of the network element is specified as 1.2.2.4.5.1.3. The number of packets received on the second interface of the network element is specified as 1.2.2.4.5.2.3. Thus, all information elements of interest are identified by an object identifier in the MIB.

The get operation is used to essentially retrieve data corresponding to a information element of interest from a specified network element. Thus, a get operation usually includes a MIB object identifier and a unique Internet address to specify the network element (or more precisely, the agent serving the network element). Agent 310 (or 370) receives the get command/operation, gathers the data from the network element 320 (or 360), and sends the gathered data corresponding to the specified information element to the NMS 330. NMS 330 receives and processes the data, and displays information corresponding to the data according to a desired user interface. SNMP also includes a 'getnext' command, which is used to retrieve successive data elements when the actual OIDs are not known (e.g., different routes of a routing table maintained by a router).

The set operation is used to set the information elements to a desired value. Configuration management of various devices is accomplished by setting the information elements to predefined desired values. For example, to turn off network element 360, NMS 330 may send a set command including an object identifier corresponding to the network element 360. Again, agent 370 receives the set command/operation, and sets the corresponding information element to a value specified in the command. Network element 360 is turned off in response to the information element being set to the above value. Using the above commands/operations in conjunction with MIB information, SNMP allows monitoring and configuration of various network elements on the networks.

SNMP 'trap' is another concept that is used by the present invention. A trap is an asynchronous event (i.e., it can occur at any random time) which occurs in a network element. The agent corresponding to the network element sends a packet indicating the occurrence of the event. For example, if network element 360 is a printer, agent 370 may detect that the printer is out-of-paper, and send a trap to NMS 330 which indicates that the printer is out of paper. The packet is sent typically to one or more predesignated network management stations as is configured on the agent beforehand. As used in the present application, a trap may be generated by applications other than those implementing SNMP. SNMP traps are those generated as a part of the implementation of the SNMP protocol.

Even though the present invention is explained in the context of SNMP, it is contemplated that alternative embodiment of the present invention can be implemented using other network management schemes, either based on open standards (e.g., ISO's CMIP) or proprietary standards.

4. Brief Introduction to the Web and Browsers

As with SNMP, only a brief introduction to the concept of Webs and Browsers provided herein. For further information on the Web Technology, the reader is referred to the documents available by using the URL http://www.w3.org which is incorporated herein by reference. The World Wide Web (WWW) includes several Web Servers which generally store and make available documents in several formats, of which the hypertext format is the most common. Each document is identified by a Uniform Resource Locator (URL). For example, a document may be identified as "www.machine.xyz.com/directory/documentname," wherein www.machine.xyz.com is a unique name assigned to a web server, 'directory' refers to a directory path on the web server, and 'documentname' is the name of the hypertext document.

A Hypertext document typically contains one or more hypertext links specified in hypertext markup language (HTML). Hypertext documents can be created and modified using one of several publicly available HTML editors. While a hypertext document is displayed, selecting a hypertext link causes an action specified with the hypertext link to be executed. Such actions include, but not limited to, displaying another document or playing a multi-media video clip.

A user typically accesses a desired hypertext document using a Web Browser. The Web Browser typically operates as a client while the Web Server operates as a server when the user examines a hypertext document. The user first accesses a desired document from a Web Browser by specifying the URL of the document. A user may also optionally specify a transfer protocol. File Transfer Protocol (FTP) and Hyper Text Transfer Protocol (HTTP) are examples of typical transfer protocols.

As the document is transferred, Web Browsers display the hypertext documents, with the hypertext links usually being highlighted. The user selects a link by typically clicking a mouse button while positioning the corresponding cursor on the highlighted portion. The action specified by the user corresponding to the Hypertext Link is executed. The user navigates through the Web by selecting one or more of the hypertext links.

Example Web Browsers are available from companies such as Netscape Communications and Microsoft. Even though the present invention is explained with reference to accessing hypertext documents with browsers, it is contemplated that other technologies available in the market place may be used to access the documents in alternate embodiments of the present invention.

5. Brief Introduction to Java

Java architecture has been initially developed and promoted by Sun Micro Systems. Only the details of the Java architecture as may be pertinent to the understanding of the present invention are described herein. For further information on Java Architecture, the reader is referred to the URL http://www.javasoft.com which is incorporated herein by reference.

The Java architecture defines a programming language for writing Java code. The code can be executed on any machine having the capability to interpret the bytes present in the code. In other words, if a machine is provided with an interpreter which can execute Java byte codes, the machine can be used to execute the code. Interpreters are generally machine architecture specific. The interpretation function addresses (or is designed to take into account) the machine specific architecture details. Thus, the Java architecture provides a scheme which enables portability of programs across machines with different architectures and implementation details.

The Java Code can comprise either applications or Applets. Applets differ from Applications in that the Applets are usually executed by browsers. Thus, by providing a Java enabled browser, Applet modules provided on a first machine can be dynamically transferred to a second machine, and executed on the second machine.

Using the features described above, the present invention enables various network management functions. Embodiments of the present invention with these functions are now described in detail.

6. Method of the Present Invention

Figure 5:
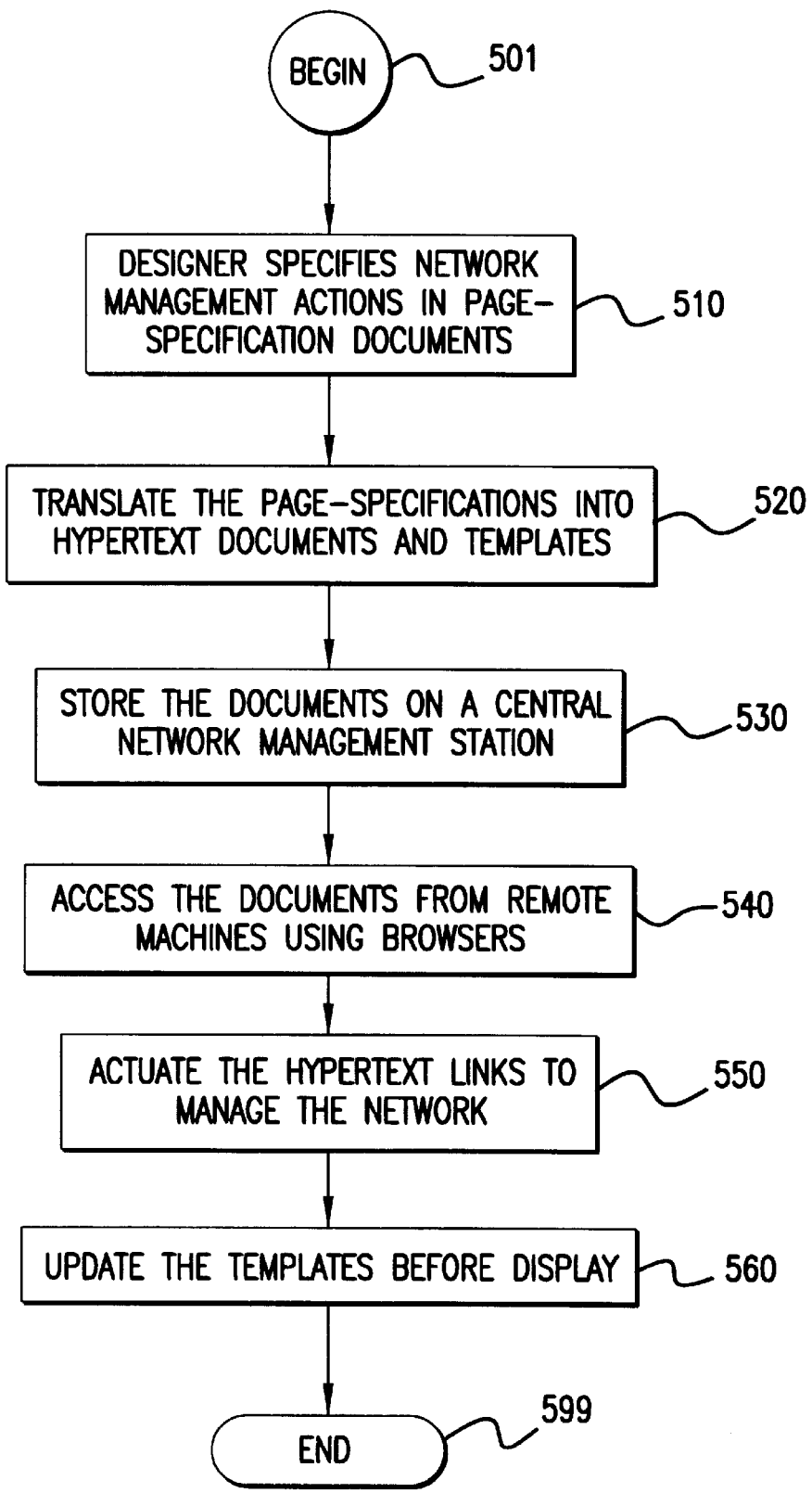
FIG. 5 is a flowchart illustrating the steps performed to manage the network in accordance with the present invention.

The present invention is first explained with reference to the flowchart of FIG. 5. The manner in which enhanced hypertext documents are generated is then explained. This is followed by description of an example architecture for implementing the present invention. The network management functions enabled by the present invention are then explained.

Flowchart 500 begins in step 501, where the control passes immediately to step 510. In step 510, a designer (typically a network element vendor) specifies network management actions in page-specification documents. Page-specification documents can be provided in ASCII format and a user can provide the page-specification documents to correspond to the specific requirements of the network management environment.

The specification documents specify the information of interest and the menu structure in which to access the information in a predefined format. An example page specification document is explained below with reference to Appendix I. It will be clear from the explanation that the predefined format provides an easy and convenient mechanism by which the designer can define the grouping of various information elements of interest (which in turn defines the navigation menus), and a scheme to obtain the data corresponding to information elements dynamically.

In step 520, the page-specification document is converted to one or more hypertext documents as explained with reference to FIG. 6. These documents are also referred to as enhanced hypertext documents as the documents can include non-standard HTML data for the operation of the present invention. Some of the documents are conventional Hypertext Documents which allow navigation across different documents. The navigation is according to the menu structure specified in step 510. Other documents generated in step 520 include templates into which data is dynamically filled upon user request. Example Hypertext documents and templates are explained below with reference to Appendices II through IV.

In step 530, the Hypertext documents are stored on a central network management station. The documents can include both hypertext documents used for navigation, template documents used for display of data dynamically retrieved from the network elements, and a combination of the two. By a comparison of the page specification document of Appendix I with the hypertext documents in Appendices II-IV (explained in greater detail below), it will be appreciated that the designer's task is substantially decreased in integrating a new device into the network management system of the present invention. The designer simply provides the page specification documents, and the present invention translates the page specification documents into one or more (enhanced) hypertext documents which provide a simple user interface to manage the network.

In step 540, a user (e.g., network manager/operator) can access the hypertext documents from any of several remote machines using a browser. As a browser is generally available on many machines in a network, the present invention allows network management from several such machines. Once a hypertext document is accessed, a user manages the network by actuating the appropriate Hypertext Links in step 550.

Thus, steps 510, 520, and 530 are performed by a designer, steps 540 are 550 are performed by a user using browsers, and step 550 is performed dynamically during run-time. The operation of the method of flowchart 500 will be clearer from the following explanation in which an example environment implementing the present invention is described.

7. Example Environment in which the present invention can be implemented

An example architecture of NMS 101 is explained below with reference to FIG. 6. The hypertext documents may be generated on NMS 101 or generated elsewhere and provided to NMS 101. The hypertext documents with only static fields (text provided for explanation) are usually used for navigating through various menus. Hypertext documents with only static fields are explained with reference to Appendix II and FIG. 7 below.

Hypertext documents with dynamic fields are explained with reference to Appendices III though VIII and FIGS. 8A, 8B, and 8C below. Specifically. Appendices III, IV and V include hypertext documents that are created by translating the page specification document of Appendix I. Documents such as these are termed as 'templates' as these include dynamic fields which store data dynamically retrieved from the network when a user actuates the appropriate hypertext links. NMS 101 retrieves the data from appropriate network elements as explained below. Hypertext text documents with the data stored are shown in Appendices VI, VII, and VIII.

In the examples described here, a template is provided for a network element of a given class/type. For example, a template may be provided for a router class/type, and another template may be provided for wiring hub class/type. However, the information for the network elements can be organized in different templates as a designer wishes. As a further example, assuming there are thirty parameters for a given network element, all thirty elements may be organized in a single template or the information can be divided into several templates. In addition, a single template can have information for more than one network element. As will be clearer with the explanation with reference to FIG. 12, such an implementation may require that a corresponding number of network element identifiers will need to be incorporated into the hypertext documents sent to the browser.

In operation, a user uses one of the computer systems 120, 130, 160 having a browser to access the hypertext documents provided on NMS 101 in ways well known in the art.

The user typically accesses the hypertext document corresponding to Appendix II and clicks on the hyperlinks to access various templates, Applets (described later), and other hypertext documents.

While requesting information using a template, a user specifies the specific network element (e.g., router 140 or router 180 within the class/type of routers) from which to retrieve data to be filled into the template. The specific network element is typically specified by an IP address or a machine name or other unique identifier for the specific network element. The present invention simplifies the user task of specifying the specific network element using the Applet interface as explained below.

After receiving the network element identifier and template identifier, NMS 101 retrieves the data corresponding to the dynamic fields and displays the data using other fields in the template. Even though each template described herein corresponds to a single network element, it will be apparent to one skilled in the relevant art that templates which include information corresponding to more than one type/class of network elements may be implemented. It is therefore within the scope and spirit of the present invention to provide hypertext documents which cause data from different network elements to be retrieved and displayed in a single display. Using such templates, a user can cause NMS 101 to manage the (inter)network.

Other functions supported by NMS 101 also include display of network maps including the elements in a network and the ability to view traps within a given time period in the past. Topology discovery generally refers to the capability of uncovering network elements connected to the network. Such uncovering may reveal new elements not known previously to network administrators. As noted already, traps are asynchronous events reported to a network management station. Ability to view traps facilitates problem resolution. These functions are also integrated into one unified interface as explained in further detail below. To fully appreciate the manner in which the present invention provides all the above-described functions, it is helpful to first understand the details of the page specification document and the corresponding templates generated by translating the documents.

8. Details of Page Specification Documents, Templates and other Hyptertext Documents To appreciate the intermediate documents and processes between the initial page specification document and the final displays, it is helpful to broadly understand the relationship between the example documents used for illustration herein. Thus, the relationship and function of each of the documents is first explained with reference to FIG. 4. Each of the documents are then explained in further detail.

Figure 4:
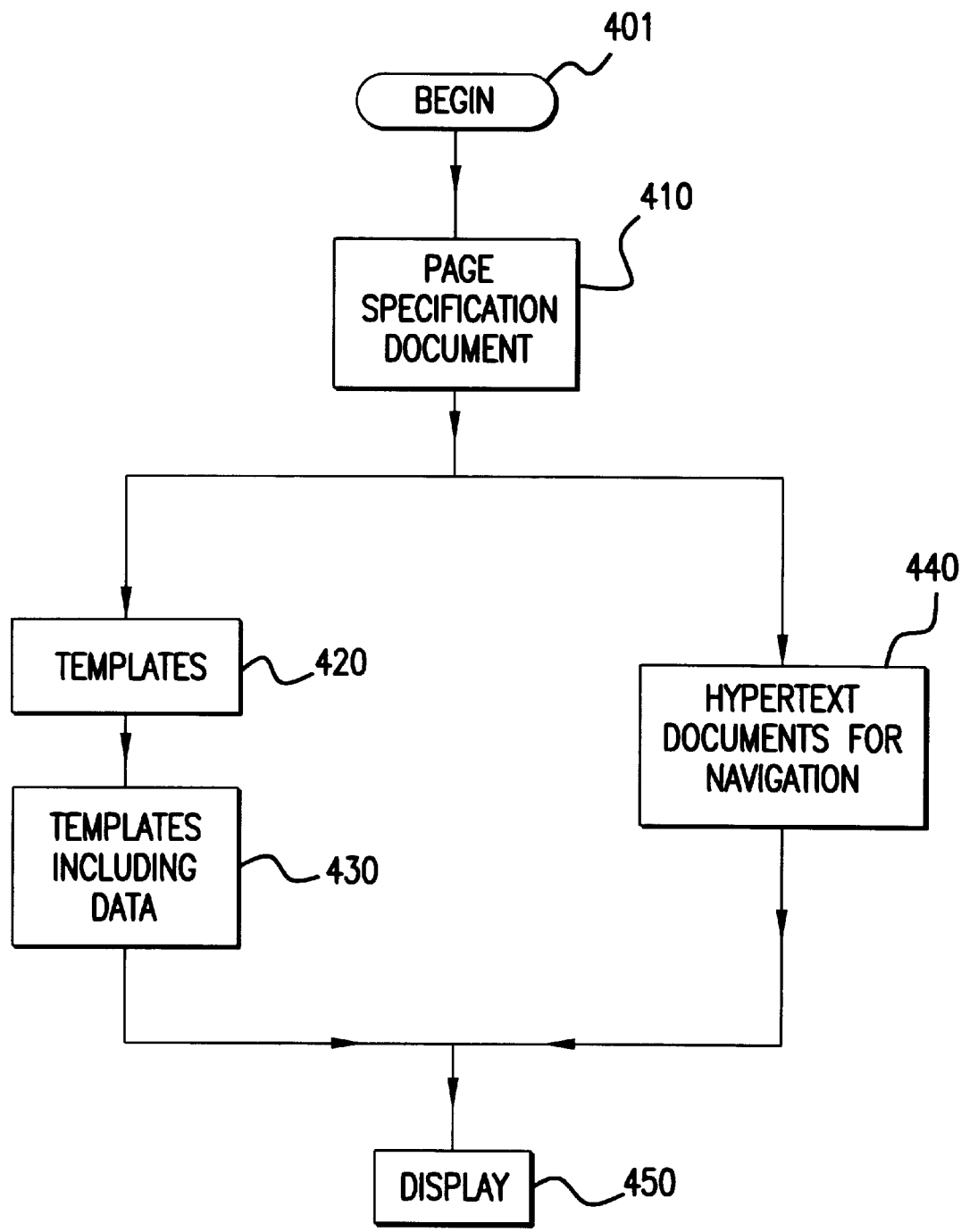
FIG. 4 is a block diagram illustrating the manner in which the hypertext documents used for network management are created from a page specification document provided in accordance with the present invention.

As already noted, an example page specification document is provided in Appendix I (shown as block 410 of FIG. 4). The page specification document defines the way of navigating (e.g., various menus and the sequence by which templates are accessed), the information elements of interest, and the mechanism of retrieving dynamically the data corresponding to the information elements of interest. The page specification documents can be generated using any ASCII editor as is known well in the art.

The enhanced hypertext documents (blocks 420 and 440) created by translating (step 520) the page specification documents are shown in Appendices II through V. The document of Appendix II (block 440 of FIG. 4) includes only static fields and the corresponding display is shown in FIG. 7. Static fields refer to the text usually provided in the page specification document. The text usually identifies the data of dynamic fields or the menu choices (text in the hypertext links) used for navigation. Dynamic fields refer to the fields which store data dynamically retrieved from the network elements.

Appendices III, IV, and V represent templates (Block 420 of FIG. 4). Appendices VI, VII, and VIII correspond to the hypertext documents (Block 430) generated by the central network management station by dynamically retrieving and storing the data specified in documents of Appendices III, IV and V, respectively. FIGS. 8A, 8B and 8C correspond to the displays generated from the enhanced hypertext documents of Appendices VI, VII, and VIII respectively. Thus, the display of FIGS. 8A, 8B, and 8C includes dynamic fields and static fields explaining the data in the dynamic fields.

The page specification document of Appendix I is now explained in further detail. The manner in which the navigating sequence (i.e, the menu structure) is specified in accordance with one convention is explained first. With respect to the manner of specifying a way of navigating through the menus, it should be understood that the convention employed in the page specification document of Appendix I is merely an example, and does not limit the scope of the present invention.

In Appendix I, indentations define the menu structure for accessing data and performing various management functions provided by the present invention. Also, the first line of the page specification document (i.e., line 1 of Appendix I), with no indentation, is used as a header of the home page (i.e., the first document displayed when the central network management station is accessed) as can be seen in FIG. 7. A space or blank character ('') is used to indicate the levels of indentation. Lines with numbers 2, 13, and 185 are shown beginning with one space. Thus, lines with numbers 2 (Actions), 13 (Configure/Show), and 185 (Current Port Status) are in the first level of indentation according to the example convention chosen in Appendix I. The lines corresponding to "Monitoring" are not included in Appendix I for conciseness. When the page specification document is translated in step 520, the text in lines in the first levels of indentation appears in the highest level of the menu tree as illustrated in Appendix II.

When the page specification document relates to a single network element type, the document of Appendix II is referred to as the 'home page' for the network element type. In general, the home page for a network element is the document which is displayed first when the user selects the network element. In the example described herein, the home pages are generated automatically when the page specification document is translated. However, it should be understood that a designer may generate a home page in several other ways and provide links to the translated documents from the home page.

Continuing with the description of the page specification documents, the text specified with the lines in the page specification document is displayed in the hypertext links. By actuating the hypertext links, a user may navigate through various menus in the hypertext documents and cause the network management station to perform the desired actions as explained below. The display corresponding to the menu at the top most level is shown in FIG. 7. The line corresponding to "Monitor" entry of Line 9 of Appendix II is not shown in Appendix I in the interest of conciseness and brevity.

Further levels of indentation are similarly defined by having more spaces. For example, under the 'Configure/show' of line 13, 'Server Parameters' is shown in line 14. Thus, by actuating the hypertext link including the text 'Configure/show,' a user is displayed a lower level menu including 'Sever Parameters.' As defined by the HTML standard, file "Its_13.cyber" refers to the HTML file name for displaying the menu including 'Server Parameters.' If the user actuates the 'Sever Parameters' hypertext link, a menu including "Boot Parameters" (Line 15 of Appendix I), "Security" (Line 22), "Internet Addresses" (Line 29) etc. are shown. As will be readily noticed, lines 15, 22, and 29 are shown indented with an additional space compared to line 14 in Appendix I.

The manner in which information elements of interest and the corresponding identification labels are specified in the page specification document according to one convention is now explained. It will be apparent to one skilled in the relevant art to provide for specifying the page specification document using other convention based on the description provided herein. Lines 16–21 of Appendix I are typical examples. Each of the lines includes an identification label a designer wishes (e.g., "Load Protocol" in line 16, "Load Host IP Address" in line 18), and a variable showing the information of interest. Such identification labels are generally referred to as static fields. An example of a variable showing information of interest is illustrated in line 16 of Appendix I, which includes an entry "{OID= servLoadProtocol.0}." As is well known in the art, servLoadProtocol identifies a MIB object identifier.

Translation step 520 entails examining the page specification documents to generate the enhanced hypertext documents. Such translation will be apparent to one skilled in the art by the examination of Appendixes I through VIII. It should be understood that the indentation scheme defines the navigation sequence from one hypertext to another according to the convention chosen in the embodiment described here. While generating the templates, the present invention examines the MIB documents to determine the object identifiers, and saves the object identifier (e.g., see Line 68 of Appendix III for the identifier corresponding to servLoadProtocol.0 in line 16 of Appendix I) in the resulting Enhanced Hypertext document (illustrated in Appendices III–V).

As will be explained with reference to FIG. 6, the network management station of the present invention uses a standard network management protocol such as SNMP to retrieve the data corresponding to the MIB object identifiers dynamically and display the data with associated identification labels specified by the designer. Even though the present invention is explained mostly with reference to SNMP protocol and MIB, it will be apparent one skilled in the relevant art to implement alternate embodiments which use other protocols or schemes to retrieve information dynamically. For example, an alternate embodiment may be designed to initiate a custom program to retrieve data from a specific network element and display the corresponding information. Yet another alternate embodiment may be implemented using the International Standard Organization's CMIP protocol.

Continuing with the explanation of the page specification document of Appendix I, line 2 includes an assert statement. In general, the assert statement can be used to check whether a desired information element of interest is within a desired range. In the specific example of line 2, the statement ensures that the agent software is implemented at least at a certain revision/version level. As can be seen, lines 3–12 specify various configuration management actions (e.g., resetting a device, disconnecting a port). Conceivably, the agent may not be implemented to support such features. The assert statement does some preliminary checking to ensure that the agent software is at least of a threshold version from which the agent software supports the configuration management functions.

Thus, the assert statement instructs the network management station to make sure that the OID (MIB Object identifier) specified (in this case kernelVERsion.0) has the value specified (in this case "2.3") before displaying the page. If the value does not match, the page specified in the failure (in this case badVersion.html) is displayed. The assert statement is translated into appropriate comments which are included into the enhanced hypertext pages.

The OIDS specified in the assert clauses as above are similar to the other OIDs in the page in the sense that the values are fetched by NMS 101 before the corresponding page is displayed. They are different in the sense that NMS 101 normally does not display the values fetched for assert clauses, but simply compares the obtained values with the specified ones throwing up a different page on mismatch. Also, assert statements are processed first before processing the other regular OIDs in a template.

Appendix I includes the following statements in Lines 6–8:

```
Cancel Reboot {assert(OID = initialize value = 1
                              failure = "/tmp/fail.html")}
Press SET to cancel the reboot operation . . .
{ensure(OID = cancelReboot.0 value = )}
```

The assert statement here is similar to the above description. The ensure statement causes NMS 101 to send a SNMP set command for the specified parameter when the set button at the bottom of the page is clicked. In this case, a page is displayed with the text "Press SET to cancel . . . " displayed at the top of the page with a set button below it. When the set button is pressed, NMS 101 will send a SNMP set command to the network element, setting cancelReboot.0 to the value 1. NMS 101 gets the information for issuing the set from comments in the enhanced hypertext pages.

Line 15 of the page specification document includes an onError statement. If an error is encountered while retrieving data specified in lines 16–21, NMS 101 displays the "/tmp/errorPage.html" (not shown in Appendices or FIGS.) specified in the onError statement, instead of the template page with erroneous data. In addition, NMS 101 includes a default error page if an error occurs and no onerror clause is specified for a group. The onError is a mechanism for the page-spec writer to create more meaningful error messages which are context dependent.

Lines 103–107 of Appendix I illustrate the manner in which tables can be displayed using the present invention. The corresponding display is shown in FIG. 8B. The table is specified as having read/write (RW) access. Accordingly, the present invention enables a user to enter data indicative of add or delete rows as will be clear from the examination of Appendix VII. NMS 101 includes the capability to 'intercept' these add/ delete/ modify requests and issue SNMP set commands to achieve the requested addition/ deletion/ modification.

Line 105 of Appendix I includes an Index statement with IpxIfName as a parameter. The index statement defines the way rows in the table are accessed. The columns corresponding to the parameters in an Index statement uniquely identify each row in the table. Accordingly, the OID specified with an index statement is used while making modifications to the corresponding row. If multiple parameters are required to uniquely specify an Index, these parameters are used with the SNMP statements while accessing the corresponding rows according to methods well known in the art. Some of the statements in the page specification document specify certain information elements as being rw (read write) access. Such an access specification may be used to further restrict the access rights.

Line 56 of Appendix I includes a 'statAttr' statement, which specifies to NMS 101 that the delete value specified (e.g., "") should be used in the SNMP set statement while trying to delete the row specified by the fields on the Index OID. The page specification document of the present invention can include a transform operation (e.g., the statement including 'gateway' in line 35 of Appendix I), which enables the designer to provide custom transformation and display capabilities of the data retrieved from a network. The transformation operation is specified by a function, which is explained now in detail.

The general syntax for specifying a transformation operation is as follows:

```
<Display prompt text> {value=<function name>(OID <oid>, OID <oid>,
..., <constant>, <constant>, ... ) access=<ro|rw> getView<viewname>
setView=<viewname>}
```

The <Display prompt text> is shown on the page and next to it a value is shown. The value is obtained as follows. First, all the OIDs specified in the parameter list to the <function name> are obtained (using the community string associated with the getview specified). Then, the function named <function name> is invoked with the obtained values along with the constants indicated. The value returned by this function is displayed.

The gateway function can be used, for example, to convert a temperature received in centigrade scale into Fahrenheit. Thus, if a network element provides temperature in centigrade scale and if the user desires to view the temperature in Fahrenheit, the gateway statement can be used to provide such transformation transparent to the user. In one embodiment, the transformation function is implemented as a Java class. The gateway function enables transformation from centigrade to Fahrenheit and vice versa. Thus, if a device maintains the temperature values in centigrade scale and the user operates in Fahrenheit mode, the temperature value is converted from centigrade to Fahrenheit when displaying the retrieved temperature value. On the other hand, if the user is setting the temperature value on a network element, the value provided by the user is converted from Fahrenheit to centigrade using the function. The transformation is performed by the components of NMS 101 as will be explained with reference to FIG. 6 below.

Continuing with the explanation of the general syntax for a transformation operation, if the access mode is rw, there is a restriction. The list of arguments to the transformation function can have only one OID, but may have many constant arguments. When the user changes the value and presses the set button, the value typed by the user is supplied to the function <function name>, along with the respective constant parameters. The value returned by this function is sent to the device to perform a SNMP set on the specified OID using the community string associated with the set-View. The restriction on number of OIDs should now be apparent. Since we need to convert the value specified by the user to a SET command, we cannot do this if the function maps two or more OIDS to a value. In general, it is not possible to take one value and convert it into the values for each of the OIDs.

In the description herein, only the concepts required for an understanding of the present invention are described in detail in the interest of conciseness and clarity. The function, purpose, and operation of other relevant statements in the appendices will be apparent by a closer examination of the documents, the context, FIGS., and the explanation provided herein.

The enhanced hypertext documents in Appendices II through V are now explained. Appendices VI, VII, and VIII are explained later with reference to FIG. 6 as the explanation involves the dynamic retrieval of data. It should be understood that NMS 101 is designed to interpret the comments in these documents to provide the desired functionality. Standard Browsers may ignore these comments. The documents in Appendices II through V may be edited further using HTML editors to enhance the presentation quality. Also, some of the files (e.g., gif files) that are referred to in these Appendices are not shown here for conciseness.

With respect to Appendix II, the lines there are standard HTML statements. In the description herein, HTML statements are not explained in detail. For a detailed understanding of HTML statements, the reader is referred to URL http://www.w3.org. The contents of files with names starting with Its referred to in lines 11–14 are not provided here for conciseness. The comments in lines 24–26 are interpreted by NMS 101 to determine that no dynamic data is to be retrieved to display the document.

With reference to the templates of Appendices III, IV, and V, there are several references (e.g., in lines 14, 20, and 26 of Appendix III) to "cyberfield $?" (where ? is a number). Each of the Cyberfields represents a dynamic field. NMS 101 retrieves data corresponding to these fields and displays the retrieved data. The attributes of these cyberfields are defined towards the end of the corresponding Enhanced hypertext Document. The data is accessed according to the attributes defined with the field.

The attributes are described in detail now. The OID field (e.g., line 68 of Appendix III) indicates the MIB object identifier. The GETVIEW and SETVIEW fields indicate the access restrictions to the data from the agent. As is well known in the art, the MIB defines the maximum level of access (read only, write, read and write) to a data element. The access may be further restricted according to a 'VIEW' which is determined by the 'COMMUNITY STRING' (akin to password). The community string can be used by the agent to permit various levels of accesses within the maximum level allowed by the MIB definitions. Most agents support a default community string of "public" which allows read-only access to most of the MIB parameters supported by an agent. Thus, a value of 'default' (e.g., in line 67 of Appendix III) for a GETVIEW attribute may mean that the NMS 101 will use the default community string.

In a default view many agents do not provide write access to the MIB parameters. To set a parameter on an agent, one usually needs to use a different view (i.e., specify a different community string). Thus, in one embodiment of the present invention, the user may specify a value with in SNMP SETVIEW field. In turn, NMS 101 translates each value into a different community string depending on various factors such as the network address (and/or domain name) of the subject network element. To that end, an administrator may provide a table on NMS 101 indicating a community string for each combination of the factors considered. NMS 101 may then dynamically select the appropriate community string from the table in assembling an SNMP set command. As a result, different computer systems may be given different levels of access to MIB variables without having to provide different hypertext documents.

The TITLE field is defined according to the identification label specified in the page specification document. For example, the title value "Load Host IP Address" in line 69 of Appendix III corresponds to Line 18 of Appendix I. As the label can be specified by a designer, a convenient label can be chosen by the designer. The same label is used in the hypertext documents. The ACCESS field specifies the maximum level access permitted by the MIB definition. Therefore, NMS 101 may check the value in the access field before initiating any SNMP set commands.

The values specified in the SYNTAX field are understood well in the art. For example, ENUM type in lines 69-70 specifies that a value of 1 corresponds to TFTP, 2 corresponds to bootp. Thus, if a value of 1 is received from the network element, NMS 101 displays the string "tftp" (See FIG. 8A) instead of 1, which is more understandable to the user.

The other statements (e.g., INPUT TYPE) in templates of Appendices II, IV and V and the hypertext documents of Appendices VI, VII, and VIII are explained with reference to FIG. 6 below.

9. An Example Architecture for Implementing the Present Invention

Figure 6:
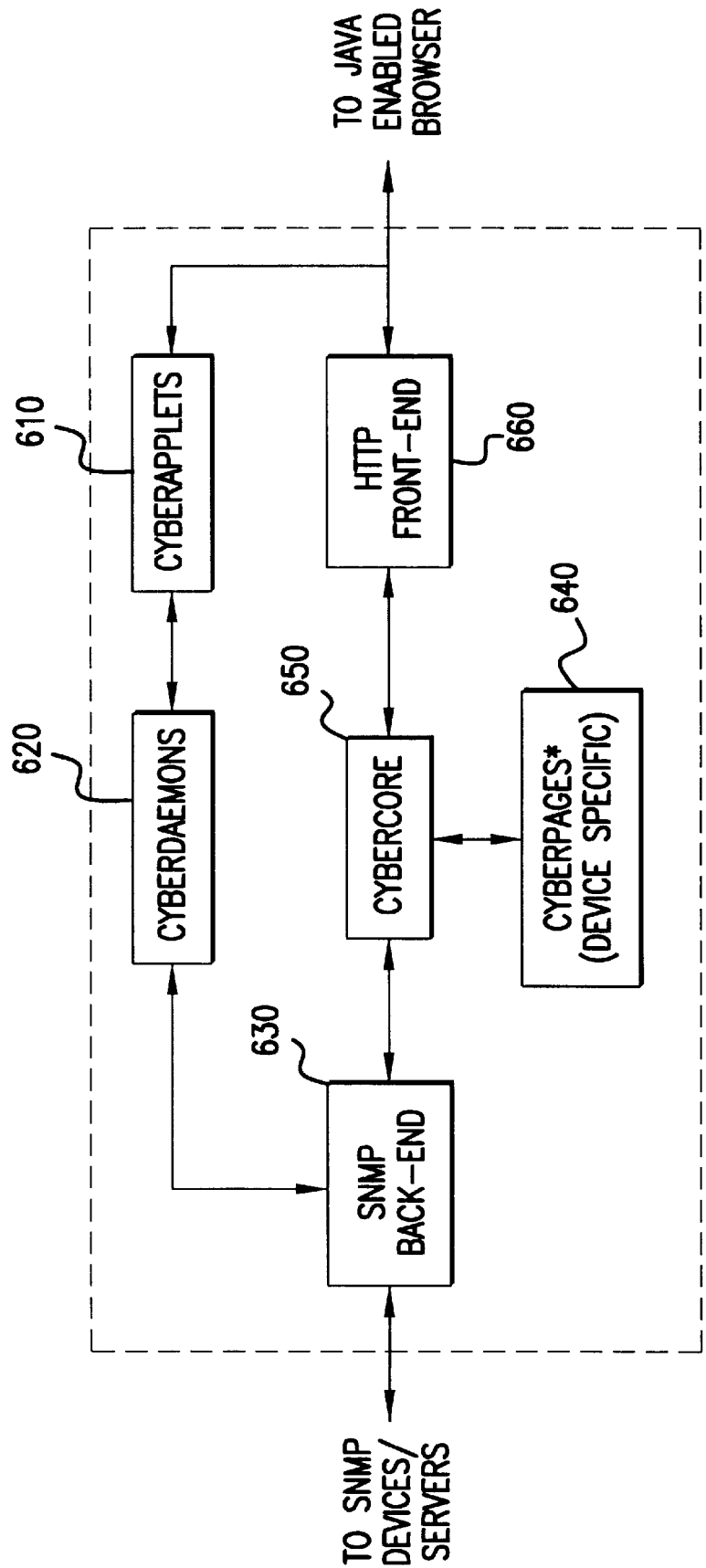
FIG. 6 is a block diagram of an example architecture for a central network management station implemented in one embodiment of the present invention.

FIG. 6 is a block diagram illustrating an example architecture for NMS 101 to implement the present invention. NMS 101 comprises an HTTP front-end 660, a core module such as cybercore 650, SNMP backend 630, cyberdaemons 620, cyberapplets 610, and cyberpages 640. Cyberdaemons 620 are used in trap management, discovery and topology display as explained later. Cyberapplets 610 provide for network map display and trap information display as also explained later. The operation and implementation of the remaining components of NMS 101 are explained now.

Cybercore 650 constitutes the heart of NMS 101, which coordinates and controls the operation of other components in NMS 101. Cybercore 650 performs many of traditional web server functions in addition to several functions to provide the features of the present invention. Thus, cybercore 650 can be implemented by modifying web-server software. For example, one embodiment can be implemented by extending the source code of the Jigsaw software available from the Web site www.w3.org/pub/WWW/Jigsaw. However, it be will be apparent to one skilled in the relevant art how to implement a customized version of the present invention by modifying another webserver implementation based on the description provided herein.

Cybercore 650 interacts with the other components to provide various features of the present invention. Cybercore 650 interacts with front-end 660, back-end 630, and displays data retrieved dynamically using the templates as explained below with reference to FIG. 11. Cybercore 650 also allows a user to perform configuration management of various network elements. Cybercore 650 interacts with cyberdaemons 620 and frontend 660 to enable a user to examine various traps generated in network 100 from a desired time in the past. In an alternate embodiment, the traps received in the past are shown as HTML log files. That is, the traps are organized as various files according to time periods and/or seriousness levels, and the files may be selectively accessed by actuating the hypertext links corresponding to the individual files.

Cyberapplets 610 provide a convenient mechanism for running programs to perform topology discovery on a user request and to further simply the user interface. An embodiment of cyberapplets 610 is implemented as Java Applet modules. The function of cyberapplets 610 will be explained with reference to FIG. 9. Front-end 660 can be implemented using the HTTP (Hypertext Transfer Protocol) interface provided in standard Web servers to transfer the hypertext documents and provide other web-browsing functions in accordance with the present invention.

An embodiment of backend 630 is implemented in C-programming language to interface with an IP network to send data retrieval and configuration management commands using SNMP to perform various features of the present invention. However, it will be apparent to one skilled in the relevant art how to implement alternative embodiments using other protocols by reading the description provided herein.

Figure 11:
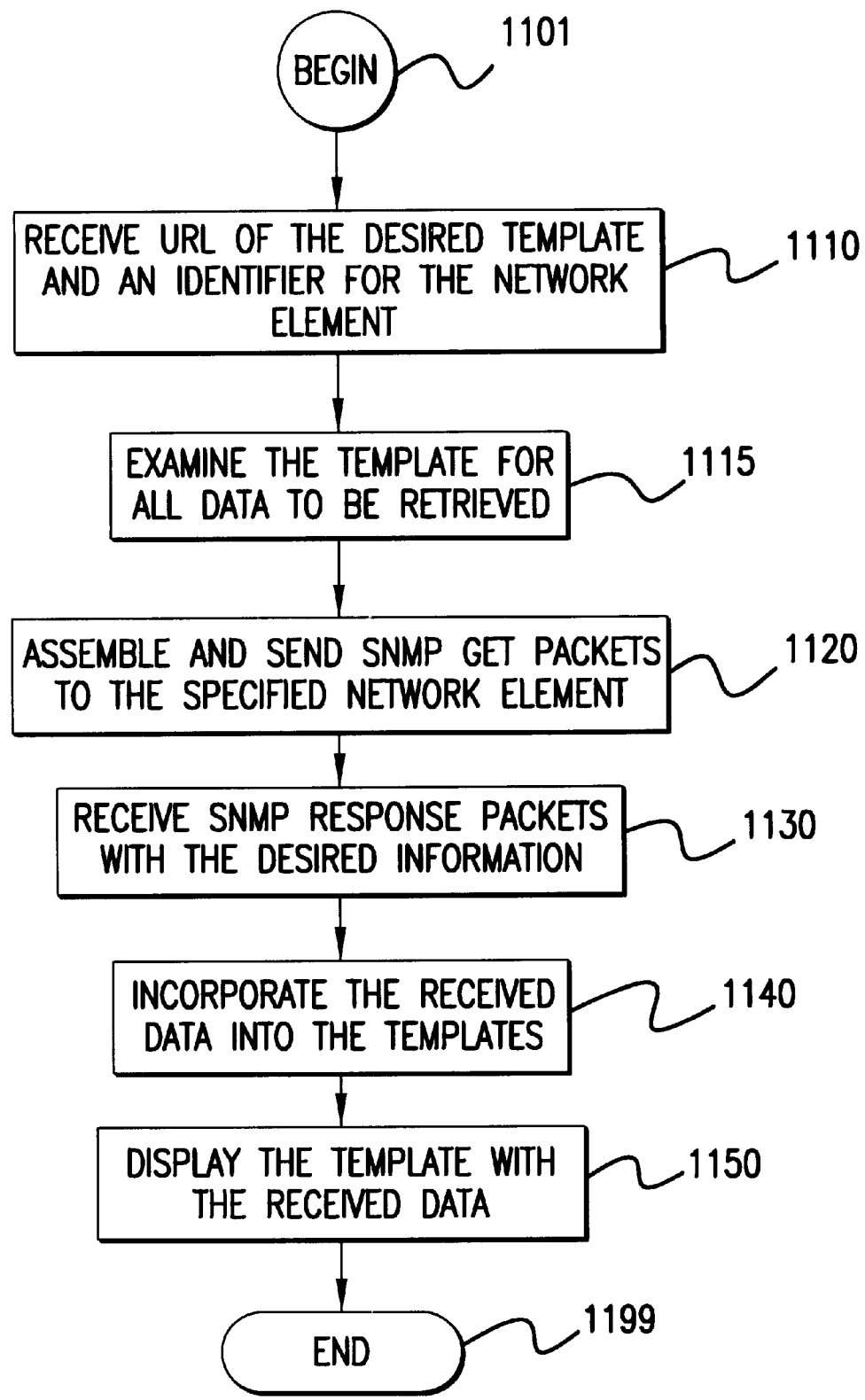
FIG. 11 is a flowchart illustrating a method for displaying data dynamically retrieved from a network in one embodiment of the present invention.

The manner in which Cybercore 650 enables a user to retrieve data dynamically from the network is now explained with reference to the flowchart of FIG. 11. In step 1110, cybercore 650 receives the URL of a desired template and an identifier for the network element from which to retrieve the data dynamically. The URL of the desired template can be generated automatically as the user actuates the appropriate hyperlinks. For example, while displaying hypertext document of Appendix II, if a user actuates the hypertext link corresponding to "Configure/Show," the URL Its_13.cyber (See line 12 of Appendix II) is automatically provided to cybercore 650. The appendices correspond to documents specified by such URLs in the examples described herein.

Thus, when a user requests display of data dynamically retrieved from a network element, one of the documents storing the HTML statements of Appendices VI, VII, or VIII is provided to cybercore 650. In one embodiment, Cybercore 650 causes a query to be generated asking the user to provide the identifier of the subject network element. Alternatively, a user may provide the complete URL with the identifier of the subject network element as a parameter as is well known in the art. The network identifier can be an IP address or a name (which can be translated to the appropriate IP address as known in the art). Alternatively, the IP address may be provided automatically by the present invention as explained with reference to FIG. 9 below.

In step 1115, cybercore 650 examines the designated template for all data to be retrieved. In the example templates shown in the Appendices, cybercore 650 examines the templates for 'Cyberfield' entries. Examples of such entries are shown in lines 14, 20, 26 and 32 of Appendix 111, and lines 16 and 17 of Appendix IV. According to the example convention chosen in the present embodiment, cybercore 650 determines that data needs to be retrieved corresponding to these dynamic fields. The information to identify the specific data to be retrieved is provided at the end of each document as explained above with reference to Appendices IV, V, and III. Cybercore 650 gathers OID numbers from the statements provided at the end of the document, and provides the OID numbers and the subject network element IP address to backend 630.

In step 1120, backend 630 assembles and sends SNMP Get packets to the subject network element in a known way. The assembly is based on the OID numbers provided in step 1115. If the requested information is in the form of a table, backend 630 generates SNMP Getnext packets also in a known way. In step 1130, cybercore 650 receives SNMP response packets from the subject network element also in a known way. The SNMP responses include the information requested by means of the corresponding template. Backend 630 keeps track of the outstanding network get requests and matches the received data with the outstanding requests.

In step 1140, cybercore 650 receives the data corresponding to the dynamic fields from backend 630. As will be appreciated, this data corresponds to the data received in response to SNMP get (next) request commands in the embodiments described above. However, it should be understood that other network management protocols (e.g., CMIP) can be used as well to retrieve the data corresponding to the dynamic fields.

Cybercore 650 associates the received data with the dynamic fields. Thus, at the end of step 1140, the hypertext documents corresponding to Appendices VI, VII or VIII are generated in accordance with the present invention. The function performed individually by cybercore 650 and backend 630, and the interface between the two can be varied according to specific design requirements. In fact, the two components can be implemented in one integrated module depending on the available technologies.

In step 1150, cybercore 650 causes frontend 660 to transfer the template filled with data to a browser. The browser displays the hypertext document in a known way. As the data is retrieved dynamically from the network elements and displayed to the user in pre-defined templates, the user can observe the desired information to understand the present status of the network.

The present invention enables the user to refresh the information displayed in the templates periodically. In addition, the information can be displayed in the form of a graph. These features are integrated into the display of step 1150 and are explained now.

Reference is made to FIG. 8C, which shows the display enabling a user to cause the display to be refreshed at specific intervals and to draw graphs. The corresponding entries in the page specification documents are shown in lines 144–146 of Appendix I. The page specification entries are translated into lines 49–55 of Appendix VIII, which enable a user to specify whether the display needs to be refreshed (by actuating the "refresh" button), whether the display should be refreshed periodically at a certain interval ("refresh interval" button), and whether to draw a graph with the graph updated according to the refresh interval ("Draw Graph").

Once the user actuates one or more of the buttons, the browser software provides the corresponding values as parameters to cybercore 650 in a predetermined known way. Cybercore 650 examines the values, causes additional SNMP get (next) request packets to be generated according to the refresh interval as explained with reference to FIG. 11, and displays the values. Generating graphs and updating the display according to the data retrieved can be performed in one of several known ways.

The present invention also enables a user to perform configuration management of various network elements. This feature is explained now with reference to the display shown in FIG. 8B. The corresponding page specification entries are shown in lines 103–107 of Appendix I. The user specifies that the table can be accessed in read and write mode (rw), and that the delete value is NULL (shown without any characters between the two double quotes). In accordance with the present invention, the lines in the page specification document are translated to the statements shown in the template of Appendix IV. After the data is dynamically retrieved and filled into the template, the corresponding hypertext statements are shown Appendix VII.

As the hypertext document of Appendix VII is displayed, the user enters the appropriate data to specify the addition or deletion or modification of rows. Cybercore 650 receives the data entered by the user in the form of parameters from the browser in a known way as will be apparent from the corresponding statements in the Appendices. Cybercore 650 interacts with backend 630 to cause SNMP set statements to be generated to cause the parameters to be varied. The OID information in the templates is used to generate the appropriate SNMP messages.

Thus, the present invention enables a user to observe the status of various network elements and to perform configuration management of various network elements. However, in the explanation above, the user may be required to provide the identification information for the subject network element, which may be cumbersome to the user. As will be clearer from the description with reference to the Java Applet Interface below, the present invention also provides a method to automatically provide such identification information.

10. Java Applet Interface

The present invention takes advantage of the Java architecture to provide an easy to use graphical user interface. Specifically, Applet modules are provided on NMS 101 and transferred to the user computer system upon a user request. When executed on the user computer system, the Applet modules provide an easily usable user interface. As the Applets are provided from one central workstation and accessed from any Java enabled browser, network management may be performed from many workstations on the network. In addition, as only one 'master copy' of the Applet modules is provided, maintenance (such as upgrading) of the Applet modules can be easily performed.

In one embodiment, the hypertext document of Appendix IX is provided as the home page for the web-server implemented in NMS 101. Accordingly, the display corresponds to this hypertext document. Several entries (e.g., the gif files) shown in the Appendix IX are not included in the description here as they are not required for an understanding of the present invention. However, it will be readily apparent to one skilled in the relevant arts how to implement the Applet modules, the gif files, and other entries of Appendix IX that are not fully explained here to perform the functions provided by the present invention.

Using the Applet Interface corresponding to Appendix IX, the present invention provides several features. NMS 101 provides a pre-stored map of the network to an Applet module presently executing on a remote computer system, and the user can actuate the Applets to access the Hypertext Documents and templates as will be explained with reference to FIG. 12. Using such access, the user can examine the present status of a network. The user can also cause NMS 101 to perform topology discovery as explained with reference to FIG. 9 below. In addition, the user can examine traps which may have occurred in the network during a predetermined time period as will be explained with reference to FIG. 10 below.

11. Network Map Display and Topology Discovery

Figure 9:
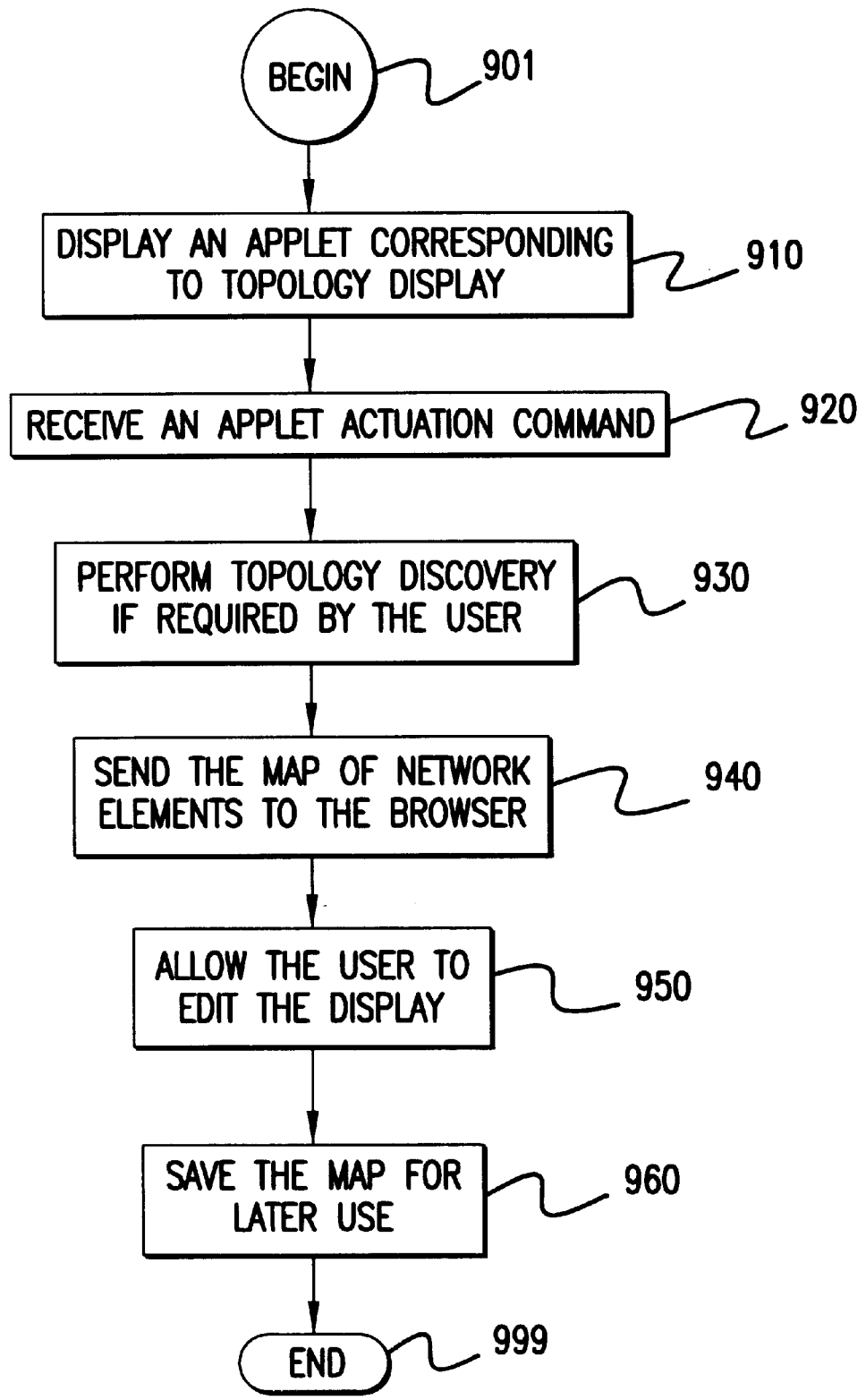
FIG. 9 is a flowchart illustrating a method of displaying the map of a network in one embodiment of the present invention.
Figure 10:
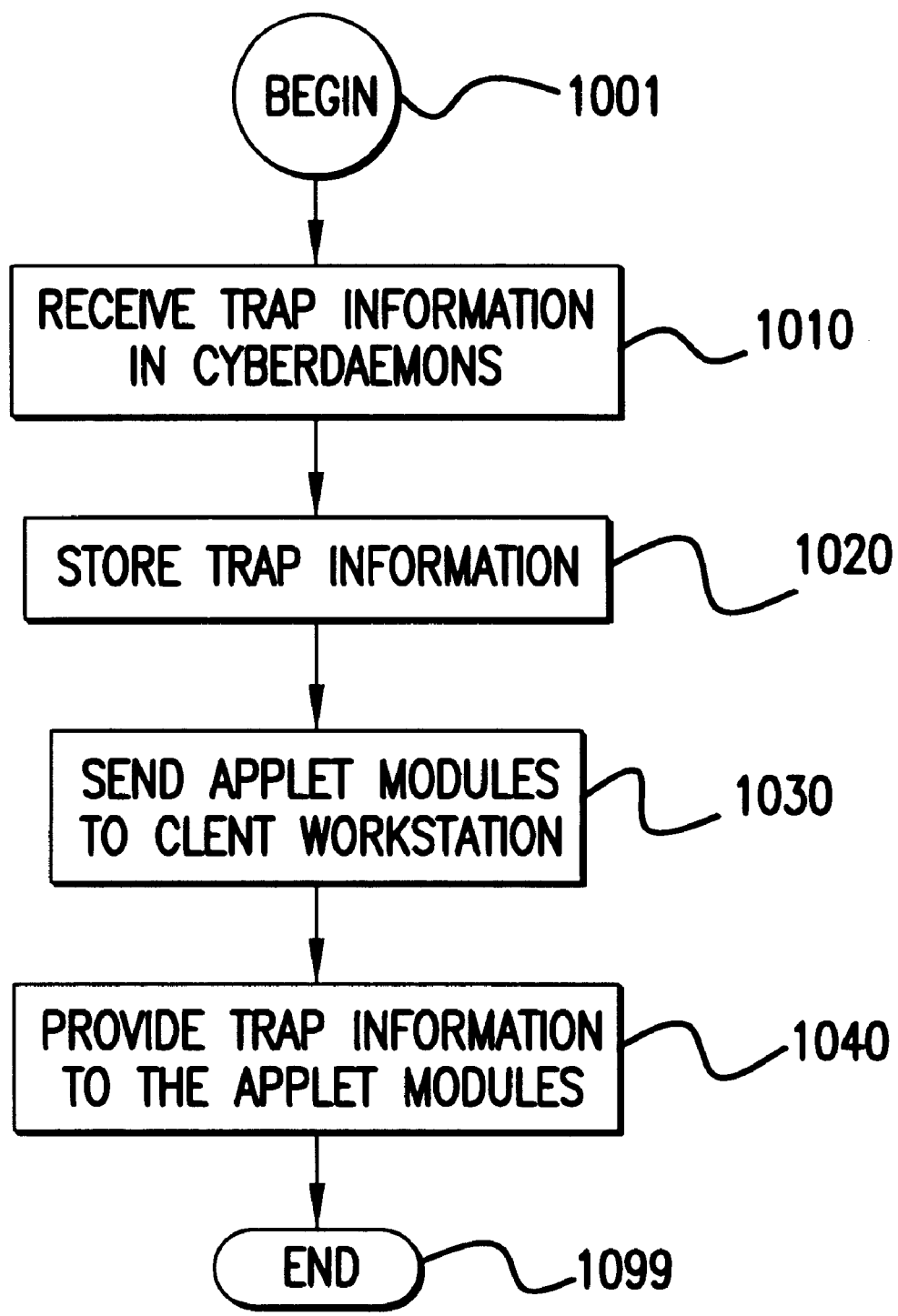
FIG. 10 is a flowchart illustrating a method of providing trap information to a user in one embodiment of the present invention.

Reference will now be made to FIG. 9. When a user accesses NMS 101 to perform network management functions, the present invention displays Applets on a portion of the display in a known way in step 910. An example display is generated when the hypertext document of Appendix IX is displayed. The Applets are labeled to correspond to the corresponding functions. One Applet can be labeled Topology display. When a user at client computer system 160 selects (or actuates) the Applet display in step 920, NMS 101 sends the Applet modules corresponding to the topology display.

The Applet module may then query the user whether topology discovery (explained below) needs to be performed or whether the user wishes to use one of the pre-stored maps. The list of pre-stored maps may be obtained or provided by NMS 101. If the user selects one of the pre-stored maps, NMS 101 provides the map information to the Applet Module which is executing.

On the other hand, if the user requests topology discovery, the request is communicated to NMS 101. Topology discovery generally refers to the process of having a network management station actively inquire the existence of network elements in a network. NMS 101 performs topology discovery in a known way in step 930. In one embodiment, NMS 101 receives network numbers (e.g., specific class-C or class B network addresses) and sends SNMP get commands to retrieve object values. One of such values corresponds to a SysObjectID variable. If a response is received for a specific SNMP get command with SysObjectID, the response packet indicates the type (e.g., router or wiring hub, etc.) of network element which responded.

Based on the IP network address of the responding network element, NMS 101 may translate the IP address into a corresponding name using well-known schemes such as host name lookup or domain name server technology. In addition, NMS 101 may associate the name with the corresponding network element. If the name is not available, NMS 101 may associate network element type (e.g., router) with the network element. NMS 101 may also get information on the vendor providing the network element and associate the information (e.g., Cisco Router) with the network element type.

In step 940, NMS 101 sends the desired map (pre-stored or one with information from topology discovery) of network elements to the Applet Module. In step 950, Applet module allows the user to manually edit the displayed map. A user may edit the map to more realistically match his/her intuitive view of the network. The user may also have topology discovery performed and then edit the new view. The user may specify a subset of the displayed network elements in a custom view. In such a custom view, network elements from different network (or sub-network) addressed can be included. Applet module sends the modified map to NMS 101 for later usage.

Using the displayed map, a user may perform several network management functions as explained below.

12. Display of Network Status Using Templates and Map Display

As already noted, cybercore 650 receives the URL of corresponding to a template and the IP address of a subject network element, retrieves from the network element with IP address the data corresponding to the information elements of interest specified in the template, and sends to the browser for display the template with the data incorporated. In one embodiment, a user may have to provide the identifier for the subject network element. Using the map displayed above, the Applet module obviates such need to have to specify the subject network element identifier as explained with reference to FIG. 12.

Figure 12:
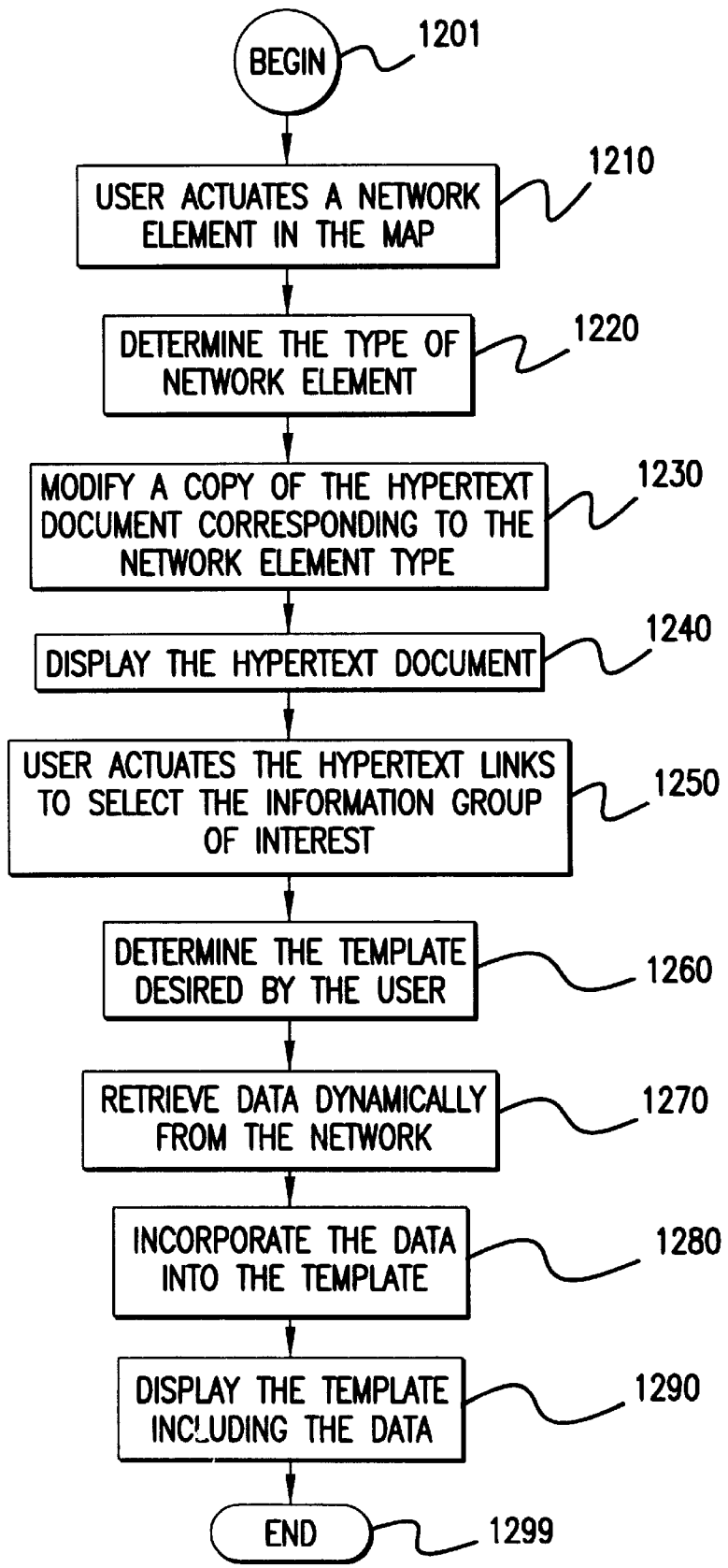
FIG. 12 is a flowchart illustrating an Applet based method for enabling a user to request display of data dynamically retrieved from the network.

In step 1210 of FIG. 12, a user selects a desired network element in the map, for example, by clicking a mouse when the cursor is on the desired network element. Applet module passes the information (e.g., by passing the IP address or the name) indicating the desired network element to NMS 101. In step 1220, NMS 101 determines the type of the selected network element. In one embodiment, NMS 101 may base the determination on a response from the network element based on the SNMP SysObjectID get packet. As explained with reference to topology discovery in step 930, NMS 101 will have sent such a packet to each network element.

Irrespective of when the SysObjectID get packet was sent, NMS 101 may maintain a table indicating the type of each of the network elements. In other words, NMS 101 may maintain a table with two columns, with the first column storing an identifier for each network element and the second column storing the corresponding type. The table may be organized as a database or simply stored in other forms in a non-volatile memory suitable for interpretation by NMS 101.

NMS 101 may also associate one of the Hypertext documents generated above for each type. As already noted, a document so associated is termed as the home page for the corresponding network element. For example, assuming the page specification document of Appendix I was generated for a single network element type, the document of Appendix II is set as the home page for all the network elements belonging to that single network element type. Thus, NMS 101 may store data that has a reference to the associated hypertext document of Appendix II with the single network element type. The data may be stored along with an indication of the type of each of the network elements. A designer may also manually provide such data for associating hypertext documents with network element types.

In step 1230, NMS 101 modifies a copy of the determined Hypertext document (i.e., home page) to encode the IP address of the selected network element with the text corresponding to the hypertext links. This enables NMS 101 to automatically receive the encoded IP address when the corresponding hypertext link is actuated. NMS 101 then uses the IP address to retrieve data from the network element corresponding to the IP address. Examples of such encoding are shown in lines 57 and 60 of Appendix X.

Encoding the IP address into the hypertext documents provides several advantages. For example, if a browser session is active over an extended period of time and if NMS 101 is reinitialized (e.g., rebooted) during that period, NMS 101 can continue to service the requests received after reinitialization as each request includes all the information for servicing the request. In general, due to such encoding, NMS 101 need not maintain any state information regarding which browser is managing which network element. It is further noted that the IP address of the subject network element being managed is encoded into static documents also so that the encoded information can be used subsequently when sending templates.

Continuing with the description of FIG. 12, in step 1240, NMS 101 sends the modified hypertext document to the remote computer system so that the browser there may display the hypertext. In step 1250, the user may actuate the hypertext links in the displayed documents to specify a desired template as explained above with reference to FIG. 1110. Accordingly, cybercore 650 receives the URL of the desired template and the encoded IP address of the subject network element by the actuation of the appropriate hypertext links. The URL identifies the desired template in step 1260.

Thus, in step 1270 cybercore 650 causes the data corresponding to information elements specified in the desired templates to be retrieved dynamically. The information is retrieved from the network elements corresponding to the encoded IP address. Cybercore 650 incorporates the retrieved data into the template, and sends the updated template to client computer system 160 for display. The user may modify the displayed data as already explained.

Thus, the Applet interface of the present invention provides a more convenient way of identifying the subject network elements and examining the status of such network elements.

13. Display of Error Conditions Using Applet Interface

The present invention provides a convenient mechanism for displaying network events which may have occurred during a specified time period. In one embodiment, an Applet display is provided which is labeled Error Conditions. When a user actuates the corresponding Applet display, NMS 101 transfers pre-stored Applet modules to client computer system 160. When executed, the Applet modules communicate with cyberdaemons 620 to display the error conditions as specified by a user at the computer system 160. This is explained in further detail below.

NMS 101 keeps track of trap information received during an extended period of time. Specifically, cyberdaemons 620 execute continuously and receive any trap information from various network elements in step 1010 of FIG. 10. As already explained, traps are asynchronous events which occur in a network, and are reported to a pre-specified network management station. Cyberdaemons 620 store the information on such traps, preferably in a non-volatile memory in step 1020. In one embodiment, cyberdaemons 620 are implemented as Unix processes which execute continuously and receive the trap information.

When a user actuates an Applet display corresponding to error conditions, NMS 101 sends Applet modules to client computer system 160 in step 1030. Client computer system 160 executes the modules as is well known in the art. The module establishes a connection with Cyberdaemons 620 to display the traps information. Even though steps 1010, 1020, 1030, and 1040 are shown as being performed in sequence in FIG. 10, it should be understood that step 1010 is typically performed continuously, even while steps 1020, 1030, and 1040 are being performed.

In one embodiment, cyberdaemons 620 transfer all the trap information to the module on client computer system 160 in step 1040. Client computer system 160 filters the received trap information to present the information as desired by a user. In another embodiment, client computer 160 specifies some parameters to designate a subset of the trap information (for example, error conditions within certain time period or with certain degree of seriousness level), and client computer system 160 displays the received data. Alternative embodiments with combination of the two schemes may also be implemented. That is, cybercore 450 may provide a first level of filtering and computer system 160 may provide another level of filtering.

It should be appreciated that the Applet maintains a permanent connection with NMS 101. This is in contrast to typical transactions that browsers are involved in; where the browser initiates a connection, exchanges the required information, and immediately terminates the connection. In the present invention, the connection is maintained by the Applet module until the Applet module is executing. The manner in which such a connection can be initiated and maintained by an Applet module will be apparent to one skilled in the relevant arts based on the description provided herein. By having a permanent connection, NMS 101 can send any newly received trap information to the executing Applet module immediately after the information is received asynchronously from any network element. Thus, cybercore 650, cyberdaemons 620, and cyberapplets 610 enable network administrators to get immediate notifications of trap information.

In one embodiment, one instance of the browser is used to permanently display the page containing the Applet module that receives trap information. This is required because if the browser is used to display another page, the browser may terminate the Applet. To prevent the Applet from being terminated, a new instance of the browser is initiated whenever a new device needs to be managed. Such initiation prevents the applet module receiving traps from being killed when devices are managed. However, it will be appreciated that various modifications can be made to this embodiment without departing from the scope and spirit of the present invention. For example, more than one device can be managed from a browser using a single connection to NMS 101.

Thus, a user can view the error conditions in a network using the Applet interface of the present invention. The architecture of an example computer system 101 for implementing the present invention is now explained.

14. Display of Templates

In the description above, cybercore 650 is described as filling the dynamic fields with actual values retrieved from a desired network element and sending the hypertext with the retrieved value to the browser on a remote computer system. The browser then displays the hypertext document in a known way. One problem with this scheme is that the designer may not have control over the manner in which each data items of the dynamic fields are displayed.

To provide a designer the ability to customize the display format, the present invention allows the designer to specify an Applet reference as shown below.

```
<applet code="..." ...>
<param name="..." value="<!-- cyberField $1 -->" >
<param name="..." value="<!-- cyberField $2 -->" >
<param name="..." value="<!-- cyberField $3 -->" >
<param name="..." value="<!-- cyberField $4 -->" >
</applet>
<cyberComments that give details on the cyberFields>
```

When cybercore 650 processes the template with the above lines, it uses the comments (i.e., cybercomments) to fetch data corresponding to all the dynamic fields (Cyberfields). Cybercore 650 also transfers the code bytes corresponding to the applet module specified in the <applet code="..."...> statement to the browser which executes the module.

The executing applet receives the values as parameters and displays the values according to the program logic specified in the applet. If there are read/write variables in the set, the applet can allow the user to modify the values and send the modified values back to cybercore 650 in the same way that the browser would have. Thus, at the expense of providing an applet module, flexibility to display the values in a desired format is achieved.

15. Implementation in an Example Computer System

Figure 13:
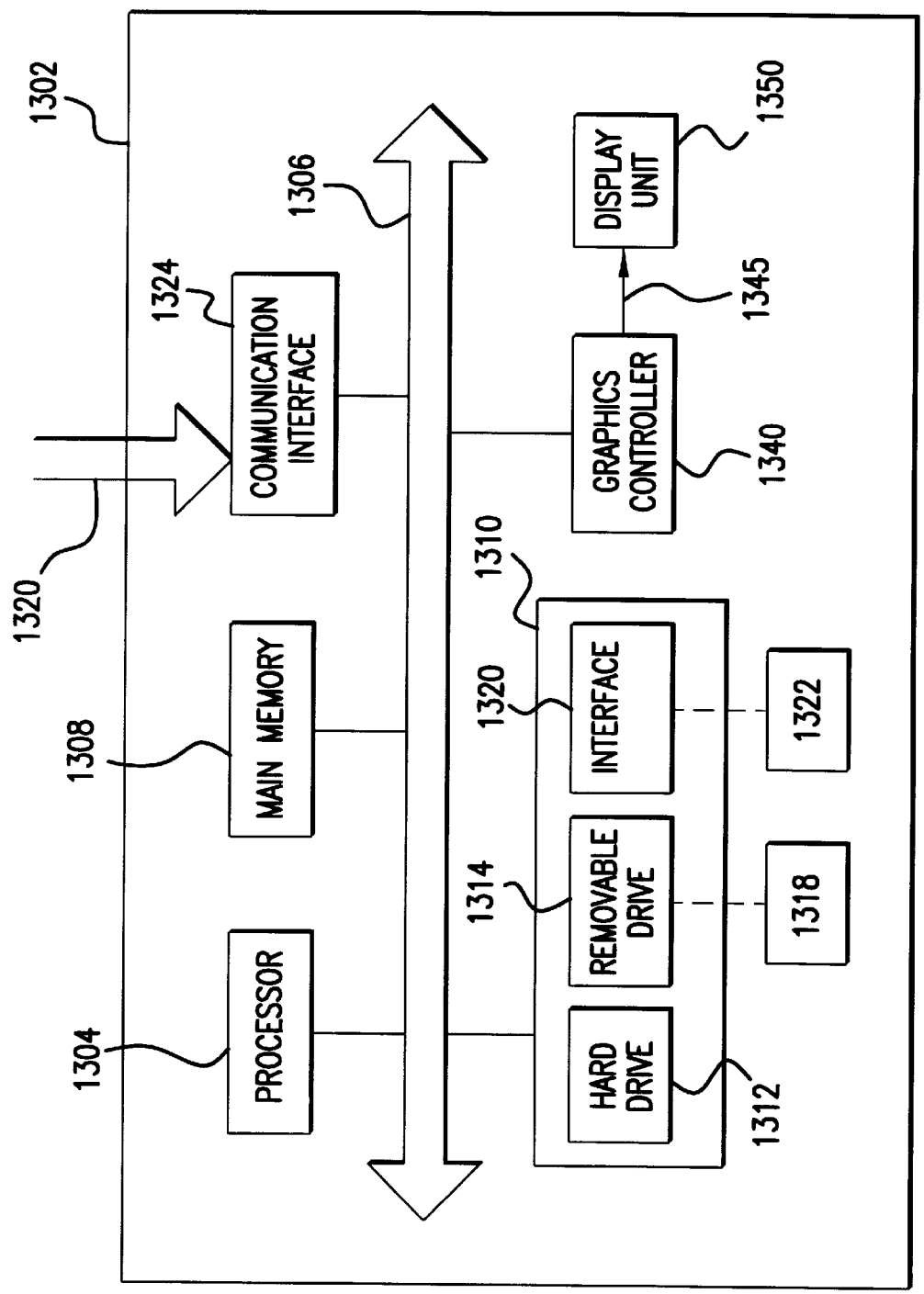
FIG. 13 is an architecture of an example computer system for implementing the present invention.

The invention may be implemented using hardware, software or a combination thereof. In fact, in one embodiment, the invention is directed toward a computer system capable of carrying out the functionality described herein. An example computer system 1302 (corresponding to network management station 101) is shown in FIG. 13. Computer system 1302 includes one or more processors, such as processor 1304. Processor 1304 is connected to a communication bus 1306. Various software embodiments are described in terms of this example computer system. In one embodiment, cybercore 650, backend 630 and front-end 660 are implemented in software, which is executed by processor 1304 to perform various functions described herein. The Applet modules and hypertext pages can be generated either in computer system 1302 or generated elsewhere.

Computer system 1302 also includes main memory 1308 (preferably random access memory), secondary memory 1310, graphics controller 1340, and display unit 1350. When the present invention is implemented as software, the software can be stored in secondary memory 1310. The hypertext documents and Applet modules can also be stored in secondary memory 1310. In operation, processor 1304 retrieves the software into main memory 1308 and executes the software to provide the features of the present invention. In an alternative embodiment, computer system 1302 may not include secondary memory 1310, and accordingly the software and other data (e.g., Applet Modules, tables) can be retrieved over communication interface 1324. Graphics controller 1340 and display unit 1350 together enable a designer to implement and install the software, Applet modules and the like, without requiring access from outside systems.

It should be understood that the functions of the individual components of computer system 1302 are provided by way of an example for illustration purposes only. It will be appreciated by one skilled in the relevant art that several modifications may be made to computer system 1302 without departing from the scope and spirit of the present invention.

Secondary memory 1310 can include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318, represents a floppy disk, magnetic tape, optical disk, etc. which is read by and written to by removable storage drive 1314. As will be appreciated, the removable storage unit 1318 includes a computer usable storage medium having stored therein computer software and/or data.

In alternative embodiments, secondary memory 1310 may include other similar means for allowing computer programs or other instructions to be loaded into computer system 1302. Such means can include, for example, a removable storage unit 1322 and an interface 1320. Examples of such interface can include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1318 to computer system 1302.

Computer system 1302 can also include a communications interface 1324. Communications interface 1324 allows software and data to be transferred between computer system 1302 and external devices. Examples of communications interface 1324 can include a modem, a network interface (such as an Ethernet card or other interface interacting with communication path 124), a communications port, a PCMCIA slot and card, etc. Software and data transferred via communications interface 1324 are in the form of signals which can be electronic, electromagnetic, optical or other signals capable of being received by communications interface 1324. These signals 1326 are provided to communications interface via a channel. This channel carries signals 1326 and can be implemented using wire or cable, fiber optics, a phone line, a cellular phone link, an RF link and other communications channels.

In this document, the terms "computer program medium" and "computer usable medium" are used to generally refer to media such as removable storage device 1318, a hard disk installed in hard disk drive 1312, and signals received on interface 1320. These computer program products are means for providing one or more of software, Applet modules, page specification documents, templates and other hypertext documents to computer system 1302.

Computer programs (also called computer control logic) are stored in main memory and/or secondary memory 1310. Computer programs can also be received via communications interface 1324. Thus, software, templates etc can be either stored within computer system 1302 or accessed from an external source such as a network. The components of computer system (e.g., cybercore 650) access the required portion of the software, templates etc. during execution in a known way depending on where they are stored. Such computer programs, when executed, enable the computer system 1302 to perform the features of the present invention as discussed herein. In particular, the computer programs, when executed, enable the processor 1304 to perform the features of the present invention. Accordingly, such computer programs represent controllers of the computer system 1302.

In an embodiment where the invention is implemented using software, the software may be stored in a computer program product and loaded into computer system 1302 using removable storage drive 1314, hard drive 1312 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

16. Conclusion

Thus, the present invention is described in the context of several examples. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

-54-

Appendix I

|     |    |                                                                                           |
|-----|----|-------------------------------------------------------------------------------------------|
|     | 1  | Welcome to LTS Management                                                                 |
|     | 2  | Actions{assert(Oid=kernelVERsion value="2.3" failure="badVersion.html")}                  |
|     | 3  | Reset Device                                                                              |
| 5   | 4  | Delay time in minutes {Oid=initWaitTime}                                                  |
|     | 5  | {ensure(Oid = initialize value = 1)}                                                      |
|     | 6  | Cancel Reboot {assert(Oid=initialize value=1 failure="/tmp/fail.html")}                   |
|     | 7  | Press SET to cancel the reboot operation...                                               |
|     | 8  | {ensure(Oid = cancelReboot value = 1)}                                                    |
| 10  | 9  | Reset Counters                                                                            |
|     | 10 | Enter Port Number {Oid=zeroCounters}                                                      |
|     | 11 | Disconnect Port                                                                           |
|     | 12 | Enter Port Number {Oid=disconnectPort}                                                    |
|     | 13 | Configure/show                                                                            |
| 15  | 14 | Server Parameters                                                                         |
|     | 15 | Boot Parameters {onError="/tmp/errorPage.html"}                                           |
|     | 16 | Load Protocol {Oid=servLoadProtocol}                                                      |
|     | 17 | Config File {Oid=servConfiguration}                                                       |
|     | 18 | Load Host IP Address {Oid=servTftpLoad}                                                   |
| 20  | 19 | Server Boot Software {Oid=servSoftware}                                                   |
|     | 20 | Lan Interface {Oid=servLanInterface}                                                      |
|     | 21 | Display Boot Messages {Oid=servBootMessages}                                              |
|     | 22 | Security                                                                                  |
|     | 23 | Login Password {Oid=servLoginPassword}                                                    |
| 25  | 24 | Privileged Password {Oid=servPrivPasswd}                                                  |
|     | 25 | Pap Password {Oid=servPPPPassword}                                                        |
|     | 26 | Chap Secret {Oid=servChapSecret}                                                          |
|     | 27 | Number of Retries Allowed {Oid=servPasswordLimit}                                         |
|     | 28 | Enable Server Security {Oid=servSecurity}                                                 |
| 30  | 29 | Internet Addresses                                                                        |

-55-

|    |    |                                                                  |
|----|----|------------------------------------------------------------------|
|    | 30 | LTS IP Address {Oid=servIPAddress}                               |
|    | 31 | LTS Number {Oid=servNumber}                                      |
|    | 32 | Server Name {Oid=servName}                                       |
|    | 33 | LTS Identification {Oid=servIdentification}                      |
| 5  | 34 | Subnet Mask {Oid=servSubNetmask}                                 |
|    | 35 | Gateway {value=gateway(Oid servGatewayAddr) access=rw}           |
|    | 36 | Contact Person {oid=sysContact}                                  |
|    | 37 | Server Location {oid=sysLocation}                                |
|    | 38 | Login Parameters                                                 |
| 10 | 39 | Login Prompt {oid=servloginPrompt}                               |
|    | 40 | Local prompt {oid=servLocalPrompt}                               |
|    | 41 | Display Login Banner {oid=servLoginBanner}                       |
|    | 42 | DNS Configuration                                                |
|    | 43 | Use DNS {oid=servDns}                                            |
| 15 | 44 | Domain Name {oid=servDomainName}                                 |
|    | 45 | Primary Name Server {oid=servPrimaryNameServer}                  |
|    | 46 | Secondary Name Server {oid=servSecondaryNameServer}              |
|    | 47 | Additional Parameters                                            |
|    | 48 | Console Port {oid=servConsolePort}                               |
| 20 | 49 | Port Inactivity Timeout {oid=servTimerInactivity}                |
|    | 50 | Session Limit {oid=servSessionLimit}                             |
|    | 51 | Server Broadcast {oid=servBroadcast}                             |
|    | 52 | Server Lock {oid=servLock}                                       |
|    | 53 | Rip Service {oid=servRipEnable}                                  |
| 25 | 54 | Tables                                                           |
|    | 55 | Host Table {v1Table, access=rw,                                  |
|    | 56 | statAttr(oid=hostName, deleteValue=""),                          |
|    | 57 | index=(hostName)}                                                |
|    | 58 | Host Name {oid=hostName}                                         |
| 30 | 59 | Host Address {oid=hostAddress}                                   |

-56-

```
     60  User Table {v1Table, access=rw,
     61  statAttr(oid=userName, deleteValue=""),
     62  index=(userName)}
     63  UserName {oid=userName}
  5  64  Callback {oid=userCallback}
     65  Authentication {oid=userPasswordStatus}
     66  Password {oid=userPassword}
     67  Idle Timeout {oid=userIdleTimeout}
     68  Callback Type {oid=userCallbackType}
 10  69  Phone/Destination {oid=userPhoneOrDestId}
     70  Service Type {oid=userServiceType}
     71  Login Service {oid=userLoginService}
     72  Login Port {oid=userLoginPort}
     73  Login IP Host {oid=userLoginIpHost}
 15  74  Framed Protocol {oid=userFramedprotocol}
     75  Framed IP Net Mask {oid=userFramedIpNetmask}
     76  Framed IP Address {oid=userFramedIpAddress}
     77  Framed MTU {oid=userFramedMTU}
     78  Callback Table {v1Table, access=rw,
 20  79  statAttr(oid=callBackDestName, deleteValue=""),
     80  index=(callBackDestName)}
     81  Destination Name {oid=callBackDestName}
     82  Phone Number {oid=callBackPhoneNum}
     83  Chat ID {oid=callBackChatId}
 25  84  IP Forwarding Table {v1Table, access=rw,
     85  statAttr(oid=ipForwardDest, deleteValue="0.0.0.0"),
     86  index=(ipForwardDest,ipForwardProto,
     87  ipForwardPolicy,ipForwardNextHop)}
     88  Destination {oid=ipForwardDest}
 30  89  Forward Mask {oid=ipForwardMask}
```

```
        90   Protocol {oid=ipForwardProto}
        91   Policy {oid=ipForwardPolicy}
        92   Next Hop {oid=ipForwardNextHop}
        93   Interface Index {oid=ipForwardIfIndex}
   5    94   Forward Type {oid=ipForwardType}
        95   Forward Age {oid=ipForwardAge}
        96   Forward Info {oid=ipForwardInfo}
        97   Next Hop AS {oid=ipForwardNextHopAS}
        98   Metric 1 {oid=ipForwardMetric1}
  10    99   Metric 2 {oid=ipForwardMetric2}
       100   Metric 3 {oid=ipForwardMetric3}
       101   Metric 4 {oid=ipForwardMetric4}
       102   Metric 13 {oid=ipForwardMetric5}
       103   IPX Table {v1Table, access=rw,
  15   104   statAttr(oid=ipxIfName, deleteValue="")
       105   index=(ipxIfName)}
       106   IPX Lan Interface {oid=ipxIfName}
       107   Interface Status {oid=ipxIfStatus}
       108
  20   109   Fault Management Parameters
       110   Enable Authentication Trap {oid=snmpEnableAuthenTraps}
       111   Enable Startup Trap {oid=snmpStartUpTrap}
       112   Community String {oid=snmpTrapCommunity}
       113   NMS Table {v1Table, access=rw,
  25   114   statAttr(oid=snmpNMSAddress, deleteValue="0.0.0.0"),
       115   index=(snmpNMSAddress)}
       116   NMS IP Address {oid=snmpNMSAddress}
       117   Community String {oid=snmpCommunity}
       118   IPX Ethernet Interface Parameters
  30   119   Interface Status {oid=ipxIfStatus.1}
```

-58-

|   | 120 | Network Number {oid=ipxNetNum.1} |
|---|---|---|
|   | 121 | IPX Protocol {oid=ipxProtocol} |
|   | 122 | Statistics |
|   | 123 | Port {v1Table, access=ro, index=(ltslineStatusPortnum)} |
| 5 | 124 | Port number {oid=ltslineStatusPortnum} |
|   | 125 | Status {oid=ltslineStatus} |
|   | 126 | Sessions {oid=ltslineSessions} |
|   | 127 | Time from last reset {oid=ltslineCounterLastReset} |
|   | 128 | Current Service {oid=ltslineCurrentService} |
| 10 | 129 | Current Node {oid=ltslineCurrentNode} |
|   | 130 | Current Remote Port {oid=ltslineCurrentRemotePort} |
|   | 131 | Input Xoff Status {oid=ltslineInputXoffStatus} |
|   | 132 | Output Xoff Status {oid=ltslineOutputXoffStatus} |
|   | 133 | IP |
| 15 | 134 | Input Datagram Statistics |
|   | 135 | Received {oid=ipInReceives graphable} |
|   | 136 | Header Errors {oid=ipInHdrErrors graphable} |
|   | 137 | Address Errors {oid=ipInAddrErrors graphable} |
|   | 138 | Datagrams Forwarded {oid=ipForwDatagrams graphable} |
| 20 | 139 | Unknown Protocol {oid=ipInUnknownProtos graphable} |
|   | 140 | Discarded {oid=ipInDiscards graphable} |
|   | 141 | Delivered {oid=ipInDelivers graphable} |
|   | 142 | Default Time To Live {oid=ipDefaultTTL} |
|   | 143 | Output Datagram Statistics |
| 25 | 144 | Requests {oid=ipOutRequests graphable} |
|   | 145 | Discards {oid=ipOutDiscards graphable} |
|   | 146 | No Route {oid=ipOutNoRoutes graphable} |
|   | 147 | Packet Reassembly Statistics |
|   | 148 | Reassembly Time out {oid=ipReasmTimeout graphable} |
| 30 | 149 | Reassembly Requests {oid=ipReasmReqds graphable} |

SKGF Ref.: 1654.0010000

-59-

|     |     |                                                                       |
| --- | --- | --------------------------------------------------------------------- |
|     | 150 | Reassembly Successes {oid=ipReasmOKs graphable}                       |
|     | 151 | Reassembly Failures {oid=ipReasmFails graphable}                      |
|     | 152 | Fragmentation Statistics                                              |
|     | 153 | Fragmentation OKs {oid=ipFragOKs graphable}                           |
| 5   | 154 | SNMP                                                                  |
|     | 155 | Incoming Packets                                                      |
|     | 156 | In Packets {oid=snmpInPkts graphable}                                 |
|     | 157 | Bad Versions {oid=snmpInBadVersions graphable}                        |
|     | 158 | Bad Community Names {oid=snmpInBadCommunityNames graphable}           |
| 10  | 159 | Bad Community Uses {oid=snmpInBadCommunityUses graphable}             |
|     | 160 | ASN Parse Errors {oid=snmpInASNParseErrs graphable}                   |
|     | 161 | Too Big Errors {oid=snmpInTooBigs graphable}                          |
|     | 162 | No Such Name Errors {oid=snmpInNoSuchNames graphable}                 |
|     | 163 | Bad Value Errors {oid=snmpInBadValues graphable}                      |
| 15  | 164 | Read onlys {oid=snmpInReadOnlys graphable}                            |
|     | 165 | General Errors {oid=snmpInGenErrs graphable}                          |
|     | 166 | Successful Get requests {oid=snmpInTotalReqVars graphable}            |
|     | 167 | Successful Set requests {oid=snmpInTotalSetVars graphable}            |
|     | 168 | Attempted Get Requests {oid=snmpInGetRequests graphable}              |
| 20  | 169 | Attempted Get Next Requests {oid=snmpInGetNexts graphable}            |
|     | 170 | Attempted Set Requests {oid=snmpInSetRequests graphable}              |
|     | 171 | Attempted Get Responses {oid=snmpInGetResponses graphable}            |
|     | 172 | Processed Traps {oid=snmpInTraps graphable}                           |
|     | 173 | Outgoing Packets                                                      |
| 25  | 174 | Out Packets {oid=snmpOutPkts graphable}                               |
|     | 175 | Too Big errors {oid=snmpOutTooBigs graphable}                         |
|     | 176 | No Such Name Errors {oid=snmpOutNoSuchNames graphable}                |
|     | 177 | Bad Value Errors {oid=snmpOutBadValues graphable}                     |
|     | 178 | General Errors {oid=snmpOutGenErrs graphable}                         |
| 30  | 179 | Get Requests generated {oid=snmpOutGetRequests graphable}             |

SKGF Ref.: 1654.0010000

-60-

|     |     |                                                                           |
| --- | --- | ------------------------------------------------------------------------- |
|     | 180 | Get Next Requests generated {oid=snmpOutGetNexts graphable}               |
|     | 181 | Set Requests generated {oid=snmpOutSetRequests graphable}                 |
|     | 182 | Get Responses generated {oid=snmpOutGetResponses graphable}               |
|     | 183 | Traps generated {oid=snmpOutTraps graphable}                              |
| 5   | 184 | Current Port Status                                                       |
|     | 185 | RCF/Ethernet                                                              |
|     | 186 | Status {oid=ltslineStatus.1}                                              |
|     | 187 | Sessions {oid=ltslineSessions.1}                                          |
|     | 188 | Current node {oid=ltslineCurrentNode.1}                                   |
| 10  | 189 | Current Remote Port {oid=ltslineCurrentRemotePort.1}                      |
|     | 190 | Current Service {oid=ltslineCurrentService.1}                             |
|     | 191 | Counter Last Reset {oid=ltslineCounterLastReset.1}                        |
|     | 192 | Input Xoff Status {oid=ltslineInputXoffStatus.1}                          |
|     | 193 | Output Xoff Status {oid=ltslineOutputXoffStatus.1}                        |

-61-

Appendix II

```
1   <HTML>
2   <HEAD> <TITLE> Welcome to LTS Management </TITLE> </HEAD>
3
4   <BODY>
5   <H2>Welcome to LTS Management</H2>
6
7   <FORM ACTION="myownactions" METHOD="POST">
8
9   <TABLE WIDTH=95%>
10  <TR><TD><A HREF="lts_2.cyber">Actions</A></TD></TR>
11  <TR><TD><A HREF="lts_13.cyber">Configure/show</A></TD></TR>
12  <TR><TD><A HREF="lts_774.cyber">Monitor</A></TD></TR>
13  <TR><TD><A HREF="lts_954.cyber">Current Port Status</A></TD></TR>
14  </TABLE>
15
16  <HR>
17
18
19  </FORM>
20
21  <!--Image links to the parent and help pages go here-->
22
23  <!--Cyber Comments: Do NOT modify!!! -->
24  <!--cyberComment nonTable
25  End cyberComment-->
26  </BODY>
27  </HTML>
```

-62-

Appendix III

```
 1  <HTML>
 2  <HEAD> <TITLE> Boot Parameters </TITLE> </HEAD>
 3
 4  <BODY>
 5  <H2>Boot Parameters</H2>
 6
 7  <FORM ACTION="myownactions" METHOD="POST">
 8
 9  <TABLE WIDTH=95%>
10  <TR>
11  <TD>Load Protocol</TD>
12  <TD> <TABLE BORDER=1> <TD>
13  <!--cyberField $1 -->
14  </TD></TABLE></TD>
15  </TR>
16  <TR>
17  <TD>Config File</TD>
18  <TD> <TABLE BORDER=1> <TD>
19  <!--cyberField $2 -->
20  </TD></TABLE></TD>
21  </TR>
22  <TR>
23  <TD>Load Host IP Address</TD>
24  <TD> <TABLE BORDER=1> <TD>
25  <!--cyberField $3 -->
26  </TD></TABLE></TD>
27  </TR>
28  <TR>
29  <TD>Server Boot Software</TD>
```

-63-

```
    30  <TD> <TABLE BORDER=1> <TD>
    31  <!--cyberField $4 -->
    32  </TD></TABLE></TD>
    33  </TR>
 5  34  <TR>
    35  <TD>Lan Interface</TD>
    36  <TD> <TABLE BORDER=1> <TD>
    37  <!--cyberField $5 -->
    38  </TD></TABLE></TD>
10  39  </TR>
    40  <TR>
    41  <TD>Display Boot Messages</TD>
    42  <TD> <TABLE BORDER=1> <TD>
    43  <!--cyberField $6 -->
15  44  </TD></TABLE></TD>
    45  </TR>
    46  </TABLE>
    47
    48  <HR>
20  49
    50  <CENTER>
    51  <INPUT TYPE="SUBMIT" NAME="Refresh" VALUE=" Refresh ">
    52  <INPUT TYPE="SUBMIT" NAME="SetRefresh" VALUE="Set Refresh
    53  Interval">
25  54  <INPUT TYPE="SUBMIT" NAME="Set" VALUE=" Set ">
    55  </CENTER>
    56
    57  </FORM>
    58
30  59  <!--Image links to the parent and help pages go here-->
```

-64-

```
60   <A HREF="lts_14.cyber"><IMG BORDER=0 ALT="Back"
61   SRC="/classes/Image/Back.gif"></A>
62   <A HREF="lts_15_help.html"><IMG BORDER=0 ALT="Help"
63   SRC="/classes/Image/Help.gif"></A>
64
65   <!--Cyber Comments: Do NOT modify!!! -->
66   <!--cyberComment nonTable
67   $1:OID=.1.3.6.1.4.1.1062.2.1.1.1.2.10.0 GETVIEW=default SETVIEW=private
68   TITLE="Load Protocol" ACCESS=rw SYNTAX=(INTEGER ENUM { tftp=1
69   bootp=2 rarp=3 self=4 auto=5 })
70   $2:OID=.1.3.6.1.4.1.1062.2.1.1.1.2.2.0 GETVIEW=default SETVIEW=private
71   TITLE="Config File" ACCESS=rw SYNTAX=(OCTET-STRING)
72   $3:OID=.1.3.6.1.4.1.1062.2.1.1.1.2.15.0 GETVIEW=default SETVIEW=private
73   TITLE="Load Host IP Address" ACCESS=rw SYNTAX=(IP-Address)
74   $4:OID=.1.3.6.1.4.1.1062.2.1.1.1.2.18.0 GETVIEW=default SETVIEW=private
75   TITLE="Server Boot Software" ACCESS=rw SYNTAX=(OCTET-STRING)
76   $5:OID=.1.3.6.1.4.1.1062.2.1.1.1.2.9.0 GETVIEW=default SETVIEW=private
77   TITLE="Lan Interface" ACCESS=rw SYNTAX=(INTEGER ENUM {
78   tenBase-T=1 ethernet=2 })
79   $6:OID=.1.3.6.1.4.1.1062.2.1.1.1.2.1.0 GETVIEW=default SETVIEW=private
80   TITLE="Display Boot Messages" ACCESS=rw SYNTAX=(INTEGER ENUM
81   { display=1 nodisplay=2 })
82   onError="/tmp/errorPage.html"
83   End cyberComment-->
84
85   </BODY>
86
87   </HTML>
```

-65-

Appendix IV

```
1   <HTML>
2   <HEAD> <TITLE> IPX Table </TITLE> </HEAD>
3
4   <BODY>
5   <H2>IPX Table</H2>
6
7   <FORM ACTION="myownactions" METHOD="POST">
8
9   <TABLE BORDER>
10  <TH>Select</TH> <!--For the Select Radio Button -->
11  <TH>IPX Lan Interface</TH>
12  <TH>Interface Status</TH>
13
14  <!--Place holders for the data and select button -->
15  <!--cyberField $1 -->
16  <!--cyberField $2 -->
17  </TABLE>
18
19  <HR>
20
21  <CENTER>
22  <INPUT TYPE="SUBMIT" NAME="AddRow" VALUE=" Add New Row ">
23  <INPUT TYPE="SUBMIT" NAME="ModifyRow" VALUE=" Modify Row">
24  <INPUT TYPE="SUBMIT" NAME="DeleteRow" VALUE=" Delete Row ">
25  </CENTER>
26  <CENTER>
27  <INPUT TYPE="SUBMIT" NAME="Refresh" VALUE=" Refresh ">
28  <INPUT TYPE="SUBMIT" NAME="SetRefresh" VALUE="Set Refresh
29  Interval">
```

SKGF Ref.: 1654.0010000

```
30    </CENTER>
31
32    </FORM>
33
34    <!--Image links to the parent and help pages go here-->
35    <A HREF="lts_54.cyber"><IMG BORDER=0 ALT="Back"
36    SRC="/classes/Image/Back.gif"></A>
37    <A HREF="lts_105_help.html"><IMG BORDER=0 ALT="Help"
38    SRC="/classes/Image/Help.gif"></A>
39
40    <!--Cyber Comments: Do NOT modify!!! -->
41    <!--cyberComment v1Table
42    $1:OID=.1.3.6.1.4.1.1062.2.1.4.7.1.1.1 GETVIEW=default SETVIEW=private
43    TITLE="IPX Lan Interface" ACCESS=ro SYNTAX=(INTEGER ENUM {
44    ether=1 ppp1=2 ppp2=3 ppp3=4 ppp4=5 ppp5=6 ppp6=7 ppp7=8 ppp8=9
45    ppp9=10 ppp10=11 ppp11=12 ppp12=13 ppp13=14 ppp14=15 ppp15=16
46    ppp16=17 })
47    $2:OID=.1.3.6.1.4.1.1062.2.1.4.7.1.1.3 GETVIEW=default SETVIEW=private
48    TITLE="Interface Status" ACCESS=rw SYNTAX=(INTEGER ENUM { up=1
49    down=2 })
50    TABLE TYPE=v1Table ACCESS=rw INDEX=( $1 ) STAT=$1
51    End cyberComment-->
52
53    </BODY>
54
55    </HTML>
```

-67-

Appendix V

```
1   <HTML>
2   <HEAD> <TITLE> Output Datagram Statistics </TITLE> </HEAD>
3
4   <BODY>
5   <H2>Output Datagram Statistics</H2>
6
7   <FORM ACTION="myownactions" METHOD="POST">
8
9   <TABLE WIDTH=95%>
10  <TR>
11  <TD>Requests</TD>
12  <TD> <TABLE BORDER=1> <TD>
13  <!--cyberField $1 -->
14  </TD></TABLE></TD>
15  <TD ALIGN=RIGHT>Enable Graphing <INPUT TYPE=CHECKBOX
16  NAME="$1.Graph"
17  VALUE=""> </TD>
18  </TR>
19  <TR>
20  <TD>Discards</TD>
21  <TD> <TABLE BORDER=1> <TD>
22  <!--cyberField $2 -->
23  </TD></TABLE></TD>
24  <TD ALIGN=RIGHT>Enable Graphing <INPUT TYPE=CHECKBOX
25  NAME="$2.Graph"
26  VALUE=""> </TD>
27  </TR>
28  <TR>
29  <TD>No Route</TD>
```

-68-

```
30  <TD> <TABLE BORDER=1> <TD>
31  <!--cyberField $3 -->
32  </TD></TABLE></TD>
33  <TD ALIGN=RIGHT>Enable Graphing <INPUT TYPE=CHECKBOX
34  NAME="$3.Graph"
35  VALUE=""> </TD>
36  </TR>
37  </TABLE>
38
39  <HR>
40
41  <CENTER>
42  <INPUT TYPE="SUBMIT" NAME="Refresh" VALUE=" Refresh ">
43  <INPUT TYPE="SUBMIT" NAME="SetRefresh" VALUE="Set Refresh
44  Interval">
45  <INPUT TYPE="SUBMIT" NAME="DrawGraph" VALUE=" Draw Graph
46  ">
47  </CENTER>
48
49  </FORM>
50
51  <!--Image links to the parent and help pages go here-->
52  <A HREF="lts_243.cyber"><IMG BORDER=0 ALT="Back"
53  SRC="/classes/Image/Back.gif"></A>
54  <A HREF="lts_253-help.html"><IMG BORDER=0 ALT="Help"
55  SRC="/classes/Image/Help.gif"></A>
56
57  <!--Cyber Comments: Do NOT modify!!! -->
58  <!--cyberComment nonTable
59  $1:OID=.1.3.6.1.2.1.4.10.0 GETVIEW=default SETVIEW=private
```

-69-

```
      60  TITLE="Requests" GRAPHABLE=true GRAPHTYPE=delta ACCESS=ro
      61  SYNTAX=(Counter)
      62  $2:OID=.1.3.6.1.2.1.4.11.0 GETVIEW=default SETVIEW=private
      63  TITLE="Discards" GRAPHABLE=true GRAPHTYPE=delta ACCESS=ro
   5  64  SYNTAX=(Counter)
      65  $3:OID=.1.3.6.1.2.1.4.12.0 GETVIEW=default SETVIEW=private TITLE="No
      66  Route" GRAPHABLE=true GRAPHTYPE=delta ACCESS=ro
      67  SYNTAX=(Counter)
      68  End cyberComment-->
  10  69
      70  </BODY>
      71
      72  </HTML>
```

-70-

Appendix VI

```
1   <HTML>
2   <HEAD> <TITLE> Boot Parameters IP Address : 192.9.60.229</TITLE>
3   </HEAD>
4
5   <BODY BACKGROUND="/Images/background.gif">
6   <BASE TARGET="values">
7   <H2>Boot Parameters</H2>
8
9   <form action="/pages/ltspages/lts_15.cyber?ip=192.9.60.229" method="post">
10
11
12  <TABLE WIDTH=95%>
13  <TR>
14       <TD BGCOLOR=#008080><FONT SIZE=+1 COLOR=white>Load
15  Protocol</FONT></TD>
16       <TD> <TABLE BORDER=1 WIDTH=100%> <TD
17  BGCOLOR=lightCyan><FONT SIZE=+1>
18       <select name="$1">
19  <option value="1" selected>tftp
20  <option value="2">bootp
21  <option value="3">rarp
22  <option value="4">self
23  <option value="5">auto
24  </select>
25  <input name="$1.old" type=hidden value="1">
26
27  </FONT></TD></TABLE></TD>
28  </TR>
29  <TR>
```

-71-

```
       30        <TD BGCOLOR=#008080><FONT SIZE=+1 COLOR=white>Config
       31  File</FONT></TD>
       32        <TD> <TABLE BORDER=1 WIDTH=100%> <TD
       33  BGCOLOR=lightCyan><FONT SIZE=+1>
   5   34        <input name="$2" value="">
       35  <input name="$2.old" type=hidden value="">
       36
       37  </FONT></TD></TABLE></TD>
       38  </TR>
  10   39  <TR>
       40        <TD BGCOLOR=#008080><FONT SIZE=+1 COLOR=white>Load Host
       41  IP Address</FONT></TD>
       42        <TD> <TABLE BORDER=1 WIDTH=100%> <TD
       43  BGCOLOR=lightCyan><FONT SIZE=+1>
  15   44        <input name="$3" value="192.9.60.25">
       45  <input name="$3.old" type=hidden value="192.9.60.25">
       46
       47  </FONT></TD></TABLE></TD>
       48  </TR>
  20   49  <TR>
       50        <TD BGCOLOR=#008080><FONT SIZE=+1 COLOR=white>Server
       51  Boot Software</FONT></TD>
       52        <TD> <TABLE BORDER=1 WIDTH=100%> <TD
       53  BGCOLOR=lightCyan><FONT SIZE=+1>
  25   54        <input name="$4" value="ncs22.mer">
       55  <input name="$4.old" type=hidden value="ncs22.mer">
       56
       57  </FONT></TD></TABLE></TD>
       58  </TR>
  30   59  <TR>
```

-72-

```
60        <TD BGCOLOR=#008080><FONT SIZE=+1 COLOR=white>Lan
61   Interface</FONT></TD>
62        <TD> <TABLE BORDER=1 WIDTH=100%> <TD
63   BGCOLOR=lightCyan><FONT SIZE=+1>
64        <select name="$5">
65   <option value="1" selected>tenBase-T
66   <option value="2">ethernet
67   </select>
68   <input name="$5.old" type=hidden value="1">
69
70   </FONT></TD></TABLE></TD>
71   </TR>
72   <TR>
73        <TD BGCOLOR=#008080><FONT SIZE=+1 COLOR=white>Display
74   Boot Messages</FONT></TD>
75        <TD> <TABLE BORDER=1 WIDTH=100%> <TD
76   BGCOLOR=lightCyan><FONT SIZE=+1>
77        <select name="$6">
78   <option value="1" selected>display
79   <option value="2">nodisplay
80   </select>
81   <input name="$6.old" type=hidden value="1">
82
83   </FONT></TD></TABLE></TD>
84   </TR>
85   </TABLE>
86
87   <HR>
88
89   <CENTER>
```

-73-

```
      90  <INPUT TYPE="SUBMIT" NAME="Refresh" VALUE=" Refresh ">
      91  <INPUT TYPE="SUBMIT" NAME="SetRefresh" VALUE="Set Refresh
      92  Interval">
      93  <INPUT TYPE="SUBMIT" NAME="Set" VALUE=" Set ">
  5   94  </CENTER>
      95
      96  <input type="hidden" name="ipAddress" value="192.9.60.229">
      97  </FORM>
      98
 10   99  <!--Image links to the parent and help pages go here-->
     100  <A HREF="lts_server.cyber?ip=192.9.60.229"><IMG BORDER=0 ALT="Back"
     101  SRC="/Images/Back.gif"></A>
     102  <A HREF="lts_15_help.html" TARGET="_blank"><IMG BORDER=0
     103  ALT="Help" SRC="/Images/Help.gif"></A>
 15  104
     105  <!--Cyber Comments: Do NOT modify!!! -->
     106
     107
     108  </BODY>
 20  109
     110  </HTML>
     111  <hr><font size=3 > CyberMan Version 1st Dec96 © <a
     112  href=http://www.wipro.com>Wipro Ltd.</a> 1996 </font>
```

-74-

Appendix VII

```
1   <HTML>
2   <HEAD> <TITLE> IPX Table IP Address : 192.9.60.229</TITLE>
3   </HEAD>
4
5   <BODY BACKGROUND="/Images/background.gif">
6   <BASE TARGET="values">
7   <H2>IPX Table</H2>
8
9   <form action="/pages/ltspages/lts_105.cyber?ip=192.9.60.229" method="post">
10
11
12  <TABLE BORDER>
13      <TH BGCOLOR=#008080><FONT SIZE=+1
14  COLOR=white>Select</FONT></TH>
15      <TH BGCOLOR=#008080><FONT SIZE=+1 COLOR=white>IPX Lan
16  Interface</FONT></TH>
17      <TH BGCOLOR=#008080><FONT SIZE=+1 COLOR=white>Interface
18  Status</FONT></TH>
19  <!--cyberTableRow Start-->
20  <TR>
21  <TD BGCOLOR=lightCyan><input type = radio name = SELECT
22  value="0">
23  <!--cyberTableRow Select--></TD>
24  <!--Place holders for the data and select button -->
25  <TD BGCOLOR=lightCyan> ether
26  </TD>
27  <TD BGCOLOR=lightCyan> down
28  </TD>
29  </TR>
```

-75-

```
     30   <input type=hidden name="$1.0" value="1">
     31
     32   <!--cyberTableRow End-->
     33   </TABLE>
5    34
     35   <HR>
     36
     37   <CENTER>
     38   <INPUT TYPE="SUBMIT" NAME="AddRow" VALUE=" Add New Row ">
10   39   <INPUT TYPE="SUBMIT" NAME="ModifyRow" VALUE=" Modify Row
     40   ">
     41   <INPUT TYPE="SUBMIT" NAME="DeleteRow" VALUE=" Delete Row
     42   ">
     43   </CENTER>
15   44   <CENTER>
     45   <INPUT TYPE="SUBMIT" NAME="Refresh" VALUE=" Refresh ">
     46   <INPUT TYPE="SUBMIT" NAME="SetRefresh" VALUE="Set Refresh
     47   Interval">
     48   </CENTER>
20   49
     50   <input type="hidden" name="ipAddress" value="192.9.60.229">
     51   </FORM>
     52
     53   <!--Image links to the parent and help pages go here-->
25   54   <A HREF="lts_54.cyber?ip=192.9.60.229"><IMG BORDER=0 ALT="Back"
     55   SRC="/Images/Back.gif"></A>
     56   <A HREF="lts_105_help.html" TARGET="_blank"><IMG BORDER=0
     57   ALT="Help" SRC="/Images/Help.gif"></A>
     58
30   59   <!--Cyber Comments: Do NOT modify!!! -->
```

-76-

```
    60
    61
    62   </BODY>
    63
5   64   </HTML>
    65   <hr><font size=3 > CyberMan Version 1st Dec96 © <a
    66   href=http://www.wipro.com>Wipro Ltd.</a> 1996 </font>
    67
```

-77-

Appendix VIII

```
1   <HTML>
2   <HEAD> <TITLE> Output Datagram Statistics IP Address :
3   192.9.60.229</TITLE> </HEAD>
4
5   <BODY BACKGROUND="/Images/background.gif">
6   <BASE TARGET="values">
7   <H2>Output Datagram Statistics</H2>
8
9   <form action="/pages/ltspages/lts_253.cyber?ip=192.9.60.229" method="post">
10
11
12  <TABLE WIDTH=95%>
13  <TR>
14      <TD BGCOLOR=#008080><FONT SIZE=+1
15  COLOR=white>Requests</FONT></TD>
16      <TD> <TABLE BORDER=1 WIDTH=100%> <TD
17  BGCOLOR=lightCyan><FONT SIZE=+1>
18      6394
19  </FONT></TD></TABLE></TD>
20  <TD ALIGN=RIGHT>Enable Graphing <INPUT TYPE=CHECKBOX
21  NAME="$1.Graph" VALUE=""> </TD>
22  </TR>
23  <TR>
24  <TD BGCOLOR=#008080><FONT SIZE=+1
25  COLOR=white>Discards</FONT></TD>
26      <TD> <TABLE BORDER=1 WIDTH=100%> <TD
27  BGCOLOR=lightCyan><FONT SIZE=+1>
28      0
29  </FONT></TD></TABLE></TD>
```

-78-

```
     30   <TD ALIGN=RIGHT>Enable Graphing <INPUT TYPE=CHECKBOX
     31   NAME="$2.Graph" VALUE=""> </TD>
     32   </TR>
     33   <TR>
 5   34   <TD BGCOLOR=#008080><FONT SIZE=+1 COLOR=white>No
     35   Route</FONT></TD>
     36        <TD> <TABLE BORDER=1 WIDTH=100%> <TD
     37   BGCOLOR=lightCyan><FONT SIZE=+1>
     38        0
10   39   </FONT></TD></TABLE></TD>
     40   <TD ALIGN=RIGHT>Enable Graphing <INPUT TYPE=CHECKBOX
     41   NAME="$3.Graph" VALUE=""> </TD>
     42   </TR>
     43   </TABLE>
15   44
     45   <HR>
     46
     47   <CENTER>
     48   <INPUT TYPE="SUBMIT" NAME="Refresh" VALUE=" Refresh ">
20   49   <INPUT TYPE="SUBMIT" NAME="SetRefresh" VALUE="Set Refresh
     50   Interval">
     51   <INPUT TYPE="SUBMIT" NAME="DrawGraph" VALUE=" Draw Graph
     52   ">
     53   </CENTER>
25   54
     55   <input type="hidden" name="ipAddress" value="192.9.60.229">
     56   </FORM>
     57   <!--Image links to the parent and help pages go here-->
     58   <A HREF="lts_243.cyber?ip=192.9.60.229"><IMG BORDER=0 ALT="Back"
30   59   SRC="/Images/Back.gif"></A>
```

-79-

```
60  <A HREF="lts_253_help.html" TARGET="_blank"><IMG BORDER=0
61  ALT="Help" SRC="/Images/Help.gif"></A>
62
63  <!--Cyber Comments: Do NOT modify!!! -->
64
65
66  </BODY>
67
68  </HTML>
69  <hr><font size=3 > CyberMan Version 1st Dec96 © <a
70  href=http://www.wipro.com>Wipro Ltd.</a> 1996 </font>
```

Appendix IX

```
1   <HTML>
2   <HEAD>
3   </HEAD>
4   <BODY>
5   <table border cellpadding=9> > <th align=left>
6   <applet code=View.Viewlet.class codebase=../classes HEIGHT=60
7   WIDTH=50>
8   </applet>
9   </th>
10  <th align=left> > <applet code=Event.Eventlet.class codebase=../classes
11  HEIGHT=60
12  WIDTH=50>
13  </applet>
14  </th>
15  <th align=left>
16  <A HREF="jv_m_grp.html#Devi" target="menu">
17  <image src="device.gif" HEIGHT=60 WIDTH=50>
18  </A>
19  </th>
20  <th align=left>
21  <A HREF="jv_m_grp.html#Conf" target="menu">
22  <image src="note.gif" HEIGHT=60 WIDTH=50>
23  </th>
24  <th align=left>
25  <A HREF="jv_m_grp.html#Brow" target="menu">
26  <image src="mib2alt1.gif" HEIGHT=60 WIDTH=50>
27  </th>
28  <tr>
```

-81-

```
     29   <td align=left> Topology Discovery </td> > <td align=left> Event Management
     30   </td>
     31   <td align=left> Device Management </td>
     32   <td align=left> Configuration Management </td>
5    33   <td align=left> MIB Browser </td>
     34   </tr>
     35   </table>
     36   </BODY>
     37   </HTML>
10   38
```

What is claimed is:

1. A method of managing a network comprising a plurality of network elements of a plurality of types, the method comprising the steps of:

storing a plurality of hypertext documents in a network management station, wherein said plurality of hypertext documents comprise at least one template, each template comprising a dynamic field identifying an information element of interest related to one of the plurality of types;

enabling a user to access said network management station using a browser;

sending an Applet module and data to said browser, wherein said data is representative of a network map of the plurality of network elements, wherein said browser executes said Applet module to display said network map;

receiving an indication of selection of one of the plurality of network elements from said browser, wherein one of the plurality of network elements is selected by the user using said network map;

selecting a home page corresponding to one of the plurality of network elements, wherein said home page is comprised in said plurality of hypertext documents, and wherein said home page includes a plurality of hypertext links;

enabling the user to access said plurality of hypertext documents by actuating said hypertext links provided in said home page;

receiving an identification of a template from said browser in response to said actuation of said hypertext link in one of said plurality of hypertext documents;

receiving an identification of one of the plurality of network elements from said browser;

assembling a simple network management protocol (SNMP) get packet specifying said information element of interest found in said dynamic field within said template;

sending said SNMP get packet to said identified one of the plurality of network elements;

receiving data corresponding to said information element of interest; and displaying said template including said received data using said browser.

2. The method of claim 1, further comprising the step of enabling a designer to generate said plurality of hypertext documents, the step of enabling a designer comprising the steps of:

enabling the designer to specify a page specification document, wherein said page specification document includes statements to define said template and to navigate between said plurality of hypertext documents; and enabling a translation of said page specification document into said plurality of hypertext documents.

3. The method of claim 1, further comprising the steps of:

sending an SNMP get request packet to request the type of an identified one of the plurality of network elements; and receiving a response packet with an indication of the type of said identified one of the plurality of network elements, wherein said template is identified based on the indication of the type.

4. A method of managing a network comprising a plurality of network elements of a plurality of types, the method comprising the steps of:

storing a plurality of hypertext documents in a network management station, wherein said plurality of hypertext documents comprise at least one template, each template comprising a dynamic field identifying an information element of interest related to one of the plurality of types;

enabling access of said plurality of hypertext documents from a browser;

receiving an identification of a template from said browser in response to an actuation of a hypertext link in one of said plurality of hypertext documents;

retrieving data corresponding to said information element of interest from one of the plurality of network elements; and displaying said template including said data.

5. The method of claim 4, wherein the step of retrieving comprises the steps of:

assembling a packet according to a network management protocol standard, wherein said packet specifies said information element of interest comprised in said dynamic field included in said template;

sending said packet to one of the plurality of network elements using said network management protocol standard; and receiving said data corresponding to said information element of interest.

6. The method of claim 5, wherein said network management protocol standard is simple network management protocol (SNMP).

7. The method of claim 6, wherein said information element of interest is identified using a management information base object identifier (MIB OID).

8. The method of claim 5, wherein a home page is associated with each of the plurality of types.

9. The method of claim 8, further comprising the steps of:

sending an SNMP get request packet with SysObjectID to one of the plurality of network elements; and receiving a response packet with an indication of the type of one of the plurality of network elements, wherein said home page corresponding to one of the plurality of network elements is identified based on said indication of the type.

10. The method of claim 9, further comprising the step of maintaining a table indicative of association of each network element with a corresponding type, wherein each of said home pages is associated with a corresponding type.

11. The method of claim 5, wherein said information element of interest comprises a row in a table.

12. The method of claim 5, further comprising the step of receiving a new value for said information element of interest from a user, and altering a value on one of the network elements with said new value using said network management protocol standard.

13. The method of step 6, further comprising the steps of:

providing an Applet module for generating a graphical display of the network;

transferring said Applet module to said browser;

executing said Applet module on said browser;

transferring to said browser a map representative of the plurality of network elements; and displaying said map, wherein the user identifies one of the plurality of network elements by selecting a portion of said map representative of one of the network elements.

14. The method of claim 13, further comprising the steps of:

receiving an indication from said browser to perform topology discovery;

performing said topology discovery in response to said received indication to determine the plurality of network elements present on the network;

sending a new map to said browser according to the determination; and displaying said new map, wherein the user identifies one of the plurality of network elements by selecting a portion of said new map representative of one of the plurality of network elements.

15. A method of generating hypertext documents used for the management of a plurality of network elements in a network, the method comprising the steps of:

providing a page specification document, wherein said page specification document includes statements identifying an information element of interest, an identifier for retrieving said information element of interest, and a corresponding label; and translating said page specification document into a plurality of the hypertext documents including a template, wherein said template includes a dynamic field corresponding to said information element of interest.

16. The method of claim 15, wherein said information element of interest comprises a row in a table.

17. The method of claim 15, further comprising the step of enabling a designer to specify whether said information element of interest can be deleted or added or modified.

18. The method of claim 15, further comprising the step of enabling a designer to specify a function with said information element of interest, wherein said function defines a manner of manipulating and displaying data retrieved corresponding to said information element of interest.

19. The method of claim 15, wherein said page specification document includes an assert statement to check whether said information element of interest on a desired network element is within a desired range of values.

20. The method of claim 15, wherein said page specification document includes an ensure statement to set a desired information element of interest to a desired value upon the indication of a user while managing the network.

21. A network management station for managing a network comprising a plurality of network elements of a plurality of types, the network management station comprising:

means for accessing a plurality of hypertext documents comprising at least one template, each template comprising a dynamic field identifying an information element of interest related to one of the plurality of types;

a front end for communicating with a browser, wherein said front-end sends one of said plurality of hypertext documents to said browser and receives an identification of a template from said browser in response to an actuation of a hypertext link in one of said plurality of hypertext documents, said front-end further receiving an identification of one of the plurality of network elements;

a backend for communicating with each of the plurality of network elements; and a core for causing said backend to retrieve data corresponding to said information element of interest from said identified one of the plurality of network elements, said core incorporating said retrieved data into said template and then causing said front-end to send said template to said browser, wherein said browser displays said template including said data in response to receiving said template.

22. The network management station of claim 21, wherein said core causes said front-end to send an Applet module and then a network map to said browser, wherein said browser displays said network map by executing said Applet module.

23. The network management station of claim 22, wherein said core receives an indication of selection of one of the plurality of network elements in the network displayed by said browser, said core identifying a home page corresponding to said selected network element, wherein said plurality of hypertext documents include said home page.

24. The network management station of claim 23, wherein said core sends said home page to said browser, and wherein said core receives an identification of another one of said hypertext documents in response to said actuation of one of said hypertext links in said display of said home page by a user.

25. The network management station of claim 24, wherein said core encodes said identification of one of the plurality of network elements into each of said hypertext documents sent to said browser such that said identification of one of the plurality of network elements is also received with each of said identification of each of said hypertext documents received from said browser.

26. The network management station of claim 25, wherein said backend uses simple network management protocol (SNMP) to communicate with the plurality of network elements.

27. The network management station of claim 25, wherein said identification of each of the plurality of network elements comprises an Internet protocol network address.

28. The network management station of claim 25, wherein said front-end uses Hyper Text Transfer Protocol to communicate with said browser.

29. The network management station of claim 25, wherein said identification of each of said hypertext documents comprises a uniform resource locator.

30. The network management station of claim 25, wherein said dynamic field comprises a management information base object identifier.

31. A computer program product for use with a computer system comprising a host processor, a main memory, a graphics controller, and a display unit, the computer program product comprising:

a computer readable program code means for causing the computer system to enable a designer to provide a page specification document, wherein said page specification document includes statements identifying an information element of interest, an identifier for retrieving said information element of interest, and a corresponding label; and a computer readable program code means for causing the computer system to translate said page specification document into a plurality of hypertext documents including a template, wherein said template includes a dynamic field corresponding to said information element of interest.

32. A computer program product for use with a computer system comprising a host processor, a main memory, a graphics controller, and a display unit, the computer system being used to manage a plurality of network elements of a plurality of types, the computer program product comprising:

a computer readable program code means for causing the computer system to access a plurality of hypertext documents comprising at least one template, each template comprising a dynamic field identifying an information element of interest related to one of the plurality of types;

a computer readable program code means for causing the computer system to communicate with a browser, wherein a front-end sends one of said plurality of hypertext documents to said browser and receives an identification of a template from said browser in response to an actuation of a hypertext link in one of said plurality of hypertext documents, the computer system further receiving an identification of one of the plurality of network elements;

a computer readable program code means for causing the computer system to communicate with each of the plurality of network elements; and a computer readable program code means for causing the computer system to retrieve data corresponding to said information element of interest from said identified one of the plurality of network elements, the computer system incorporating said data into said template and then sending said template to said browser, wherein said browser displays said template including said data in response to receiving said template.

33. The computer program product of claim 32, further comprising a computer readable program code means for causing the computer system to send an Applet module and a network map to said browser, wherein said browser displays said network map by executing said Applet module.

34. The computer program product of claim 33, further comprising a computer readable program code means for causing the computer system to receive an indication of selection of one of the plurality of network elements in a network displayed by said browser, the computer system identifying a home page corresponding to said selected network element, wherein said plurality of hypertext documents include said home page.

35. The computer program product of claim 34, further comprising a computer readable program code means for causing the computer system to send said home page to said browser, and wherein the computer system receives an identification of another one of said hypertext documents in response to an actuation of one of said hypertext links in the display of said home page by a user.

36. The computer program product of claim 35, further comprising a computer readable program code means for causing the computer system to encode an identification of one of the plurality of network elements into each of said hypertext documents sent to said browser such that said identification of one of the plurality of network elements is also received with each of said identification of each of said hypertext documents received from said browser.

37. A method of managing error conditions in a network comprising a plurality of network elements, said method comprising the steps of:

configuring one of the plurality of the network elements to send indications of the error conditions to a network management station;

implementing a daemon to receive said indications of the error conditions;

enabling access to said network management station from a browser;

sending one or more Applets to said browser, wherein said Applets when executed provide an interface to display the error conditions; and sending data representative of the error conditions from said daemon to said executing Applets to display the error conditions to a user of said browser.

38. The method of claim 37, wherein the error conditions comprise SNMP traps.

39. The method of claim 37, further comprising the step of filtering the error conditions before sending to said browser.

40. The method of claim 37, further comprising the step of filtering the error conditions in said browser to display desired error conditions to a user.

41. The method of claim 37, wherein said browser maintains a permanent connection with said network management station.

* * * * *